US011105631B2

(12) United States Patent
Nagata et al.

(10) Patent No.: US 11,105,631 B2
(45) Date of Patent: Aug. 31, 2021

(54) PHYSICAL QUANTITY SENSOR, INERTIA MEASUREMENT DEVICE, VEHICLE POSITIONING DEVICE, PORTABLE ELECTRONIC APPARATUS, ELECTRONIC APPARATUS, AND VEHICLE

(71) Applicant: Seiko Epson Corporation, Tokyo (JP)

(72) Inventors: Kazuyuki Nagata, Minowa (JP); Takayuki Kikuchi, Chino (JP)

(73) Assignee: Seiko Epson Corporation

( * ) Notice: Subject to any disclaimer, the term of this patent is extended or adjusted under 35 U.S.C. 154(b) by 387 days.

(21) Appl. No.: 16/143,706

(22) Filed: Sep. 27, 2018

(65) Prior Publication Data

US 2019/0101391 A1   Apr. 4, 2019

(30) Foreign Application Priority Data

Sep. 29, 2017   (JP) ............................. JP2017-189559

(51) Int. Cl.
*G01C 19/5747* (2012.01)
*G01C 19/5649* (2012.01)

(52) U.S. Cl.
CPC ..... *G01C 19/5747* (2013.01); *G01C 19/5649* (2013.01)

(58) Field of Classification Search
CPC ..................... G01C 19/5747; G01C 19/5649
USPC ...................................................... 73/504.12
See application file for complete search history.

(56) References Cited

U.S. PATENT DOCUMENTS

| | | | | |
|---|---|---|---|---|
| 5,635,638 A * | 6/1997 | Geen | ................... | G01C 19/5719 73/504.04 |
| 6,122,961 A * | 9/2000 | Geen | ................... | G01C 19/5719 73/504.12 |
| 7,313,958 B2 * | 1/2008 | Willig | ................ | G01C 19/5747 73/504.12 |
| 8,261,614 B2 * | 9/2012 | Hartmann | ............ | G01C 19/574 73/504.12 |
| 8,306,747 B1 * | 11/2012 | Gagarin | ................... | G01C 7/04 701/514 |
| 8,443,668 B2 * | 5/2013 | Ohms | ................ | G01C 19/5747 73/504.12 |
| 8,453,504 B1 * | 6/2013 | Mao | ..................... | G01C 19/574 73/504.14 |
| 8,794,067 B2 * | 8/2014 | Schmid | ................ | G01C 19/574 73/504.12 |
| 9,453,927 B2 | 9/2016 | Heitz et al. | | |
| 10,234,477 B2 * | 3/2019 | Anac | ................... | G01C 19/5726 |
| 2006/0272411 A1 * | 12/2006 | Acar | ................... | G01C 19/5712 73/504.04 |
| 2010/0107759 A1 * | 5/2010 | Kato | ................... | G01C 19/5719 73/504.12 |
| 2011/0132087 A1 | 6/2011 | Ohms et al. | | |

(Continued)

*Primary Examiner* — Nathaniel T Woodward
(74) *Attorney, Agent, or Firm* — Harness, Dickey & Pierce, P.L.C.

(57) ABSTRACT

A physical quantity sensor includes a drive vibrator, a detection vibrator, and an elastic deformation portion disposed between the drive vibrator and the detection vibrator and elastically deformable along a first axis in which the drive vibrator and the detection vibrator are aligned, in plan view, and in which the drive vibrator and the detection vibrator vibrate in reverse phases along the first axis. The drive vibrator and the detection vibrator vibrating alternately repeat approaching and separating from each other along the first axis.

20 Claims, 20 Drawing Sheets

(56) References Cited

U.S. PATENT DOCUMENTS

| | | | |
|---|---|---|---|
| 2012/0061172 A1* | 3/2012 | Yacine | G01C 19/5747 181/121 |
| 2015/0022277 A1* | 1/2015 | Yamauchi | G01C 19/5726 332/109 |
| 2015/0316378 A1* | 11/2015 | Kergueris | G01C 19/5747 73/504.12 |
| 2017/0350701 A1* | 12/2017 | Geisberger | G01C 19/5747 |
| 2018/0031603 A1* | 2/2018 | Huang | G01P 15/14 |
| 2018/0321039 A1* | 11/2018 | Neul | G01C 19/5712 |
| 2019/0383612 A1* | 12/2019 | Geisberger | G01C 19/5747 |
| 2020/0088519 A1* | 3/2020 | Jomori | H01L 41/1132 |

* cited by examiner

PHYSICAL QUANTITY SENSOR, INERTIA MEASUREMENT DEVICE, VEHICLE POSITIONING DEVICE, PORTABLE ELECTRONIC APPARATUS, ELECTRONIC APPARATUS, AND VEHICLE

CROSS-REFERENCE TO RELATED APPLICATION

This nonprovisional application claims the benefit of Japanese Patent Application No. 2017-189559 filed Sep. 29, 2017, the entire disclosure of which is incorporated herein by reference.

BACKGROUND

1. Technical Field

The present invention relates to a physical quantity sensor, an inertia measurement device, a vehicle positioning device, a portable electronic apparatus, an electronic apparatus, and a vehicle.

2. Related Art

For example, an angular velocity sensor disclosed in US Patent Application Publication No. 2011/0132087 includes a support substrate and an element portion supported by the support substrate. The element portion includes a drive portion that vibrates in the X-axis direction and a detection portion that vibrates in the X-axis direction together with the drive portion and vibrates also in the Z-axis direction when angular velocity around the Y-axis is applied.

However, in the angular velocity sensor described in US Patent Application Publication No. 2011/0132087, since the drive portion and the detection portion are connected by a beam, the drive portion and the detection portion vibrate in the same phase in the X-axis direction. For that reason, vibration leakage to the support substrate is liable to become large, and a Q value of the physical quantity sensor is reduced by an amount corresponding to vibration leakage.

SUMMARY

An advantage of some aspects of the invention is to provide a physical quantity sensor capable of reducing a decrease in Q value, an inertia measurement device, a vehicle positioning device, a portable electronic apparatus, an electronic apparatus, and a vehicle.

The invention can be implemented as the following configurations.

A physical quantity sensor according to an aspect of the invention includes a drive vibrator, a detection vibrator, and an elastic deformation portion disposed between the drive vibrator and the detection vibrator and elastically deformable in a first direction in which the drive vibrator and the detection vibrator are aligned, in a plan view, and in which the drive vibrator and the detection vibrator vibrate in reverse phases in the first direction.

With this configuration, vibrations of the drive vibrator and the detection vibrator are canceled, and vibration leakage is reduced. For that reason, a physical quantity sensor capable of reducing a decrease in Q value is obtained.

In the physical quantity sensor, the drive vibrator and the detection vibrator may vibrate so as to alternately repeat approaching and separating from each other.

With this configuration, vibrations of the drive vibrator and the detection vibrator are canceled, and vibration leakage is reduced.

In the physical quantity sensor, it is preferable that a mass of the drive vibrator and a mass of the detection vibrator are different.

With this configuration, amplitude of the detection vibrator can be easily adjusted.

In the physical quantity sensor, it is preferable that the mass of the drive vibrator is smaller than the mass of the detection vibrator.

With this configuration, it is possible to effectively increase an amplitude of the detection vibrator.

In the physical quantity sensor, it is preferable that an amplitude of the detection vibrator vibrating in the first direction is larger than an amplitude of the drive vibrator vibrating in the first direction.

With this configuration, detection sensitivity of a physical quantity is improved.

In the physical quantity sensor, it is preferable that the elastic deformation portion includes an elastic deformation portion main body, a first beam connecting the elastic deformation portion main body and the drive vibrator, and a second beam connecting the elastic deformation portion main body and the detection vibrator.

With this configuration, the configuration of the elastic deformation portion becomes relatively simple.

In the physical quantity sensor, it is preferable that the elastic deformation portion main body includes a first arm of which a longitudinal direction is along a second direction orthogonal to the first direction and which is elastically deformable in the first direction, a second arm of which a longitudinal direction is along the second direction, which is disposed to be spaced apart from the first arm by a gap in the first direction, and which is elastically deformable in the first direction, a first connection portion connecting one end sides of the first arm and the second arm with each other, and a second connection portion connecting the other end sides of the first arm and the second arm with each other.

With this configuration, the configuration of the elastic deformation portion main body becomes relatively simple.

In the physical quantity sensor, it is preferable that the elastic deformation portion includes a plurality of the elastic deformation portion main bodies disposed in series.

With this configuration, the amplitude of the detection vibrator can be increased.

In the physical quantity sensor, it is preferable that the physical quantity sensor includes a plurality of the elastic deformation portions.

With this configuration, stress concentration on a connection portion between a spring and the detection vibrator and a connection portion between the spring and the drive vibrator is alleviated. For that reason, impact resistance can be enhanced.

In the physical quantity sensor, it is preferable that the elastic deformation portion has a spring shape.

With this configuration, the configuration of the elastic deformation portion becomes simple.

An inertia measurement device according to another aspect of the invention includes the physical quantity sensor according to the aspect of the invention and a control circuit that controls driving of the physical quantity sensor.

With this configuration, it is possible to obtain the effect of the physical quantity sensor and to obtain an inertia measurement device with high reliability.

A vehicle positioning device according to another aspect of the invention includes the inertia measurement device according to the aspect of the invention, a reception unit that receives a satellite signal on which position information is superimposed from a positioning satellite, an acquisition unit that acquires position information of the reception unit based on the received satellite signal, a computation unit that computes an attitude of the vehicle based on inertia data output from the inertia measurement device, and a calculation unit that calculates a position of the vehicle by correcting the position information based on the calculated attitude.

With this configuration, it is possible to obtain the effect of the inertia measurement device and to obtain a vehicle positioning device with high reliability.

A portable electronic apparatus according to another aspect of the invention includes the physical quantity sensor according to the aspect of the invention, a case that accommodates the physical quantity sensor, a processing unit that is accommodated in the case and processes output data from the physical quantity sensor, a display that is accommodated in the case, and a translucent cover that covers an opening of the case.

With this configuration, it is possible to obtain the effect of the physical quantity sensor and to obtain a portable electronic apparatus with high reliability.

An electronic apparatus according to another aspect of the invention includes the physical quantity sensor according to the aspect of the invention, a control circuit, and a correction circuit.

With this configuration, it is possible to obtain the effect of the physical quantity sensor and to obtain an electronic apparatus with high reliability.

A vehicle according to another aspect of the invention includes the physical quantity sensor according to the aspect of the invention and an attitude control unit.

With this configuration, it is possible to obtain the effect of the physical quantity sensor and to obtain a vehicle with high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, an inertia measurement device, a vehicle positioning device, a portable electronic apparatus, an electronic apparatus, and a vehicle according to the invention will be described in detail based on the embodiments illustrated in the accompanying drawings.

First Embodiment

First, a physical quantity sensor according to a first embodiment will be described.

Figure 1:
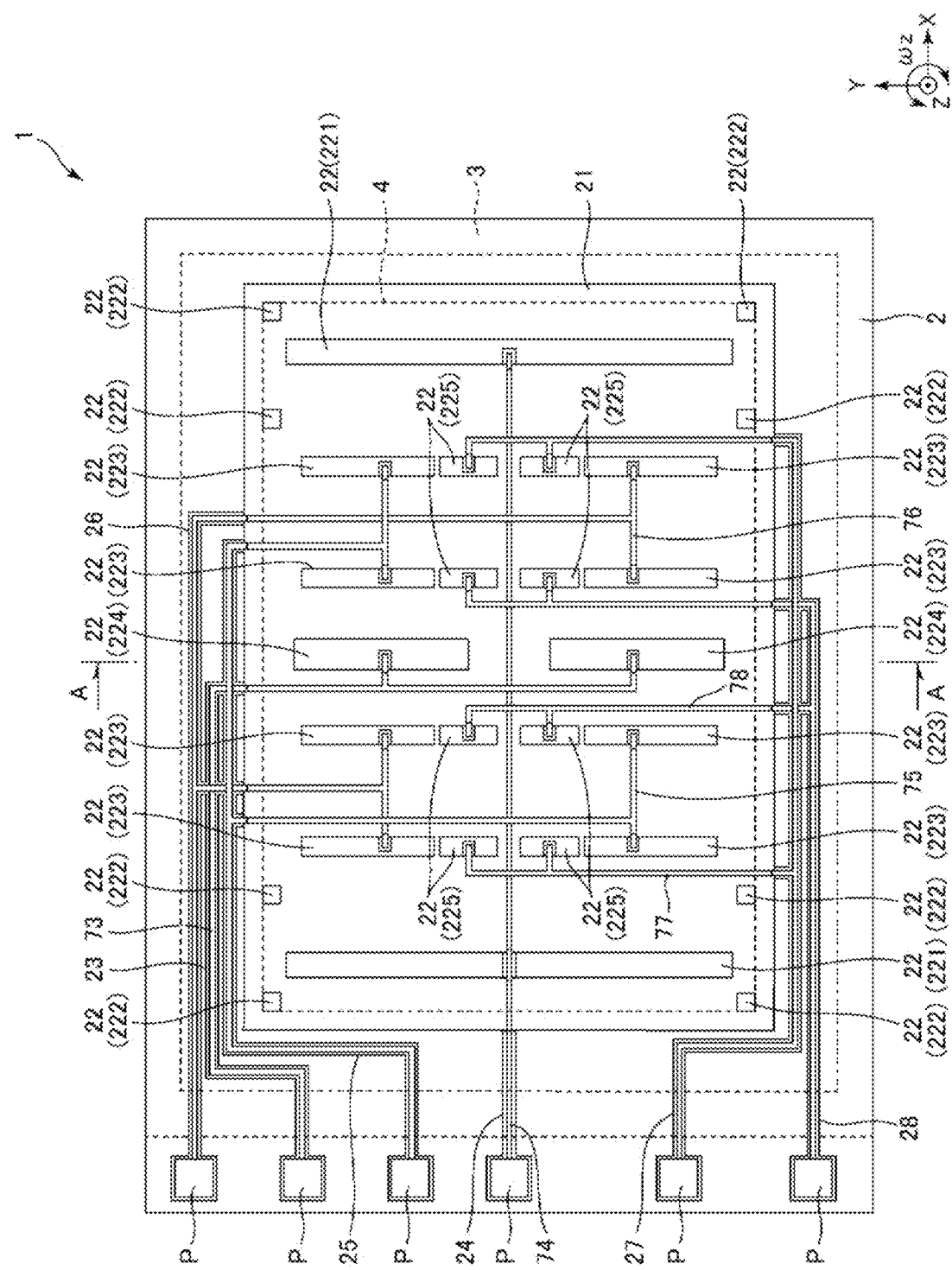
FIG. 1 is a plan view illustrating a physical quantity sensor according to a first embodiment.
Figure 2:
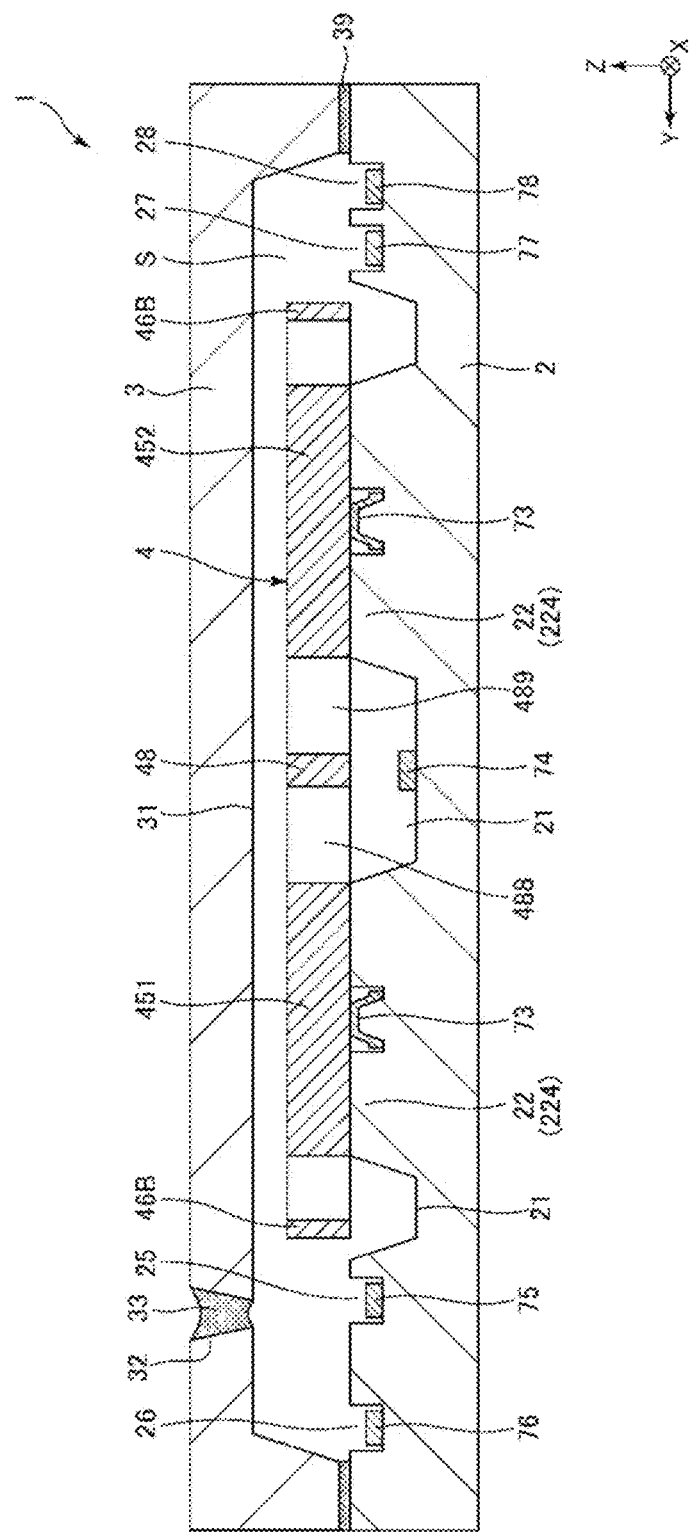
FIG. 2 is a cross-sectional view taken along line A-A in FIG. 1.
Figure 3:
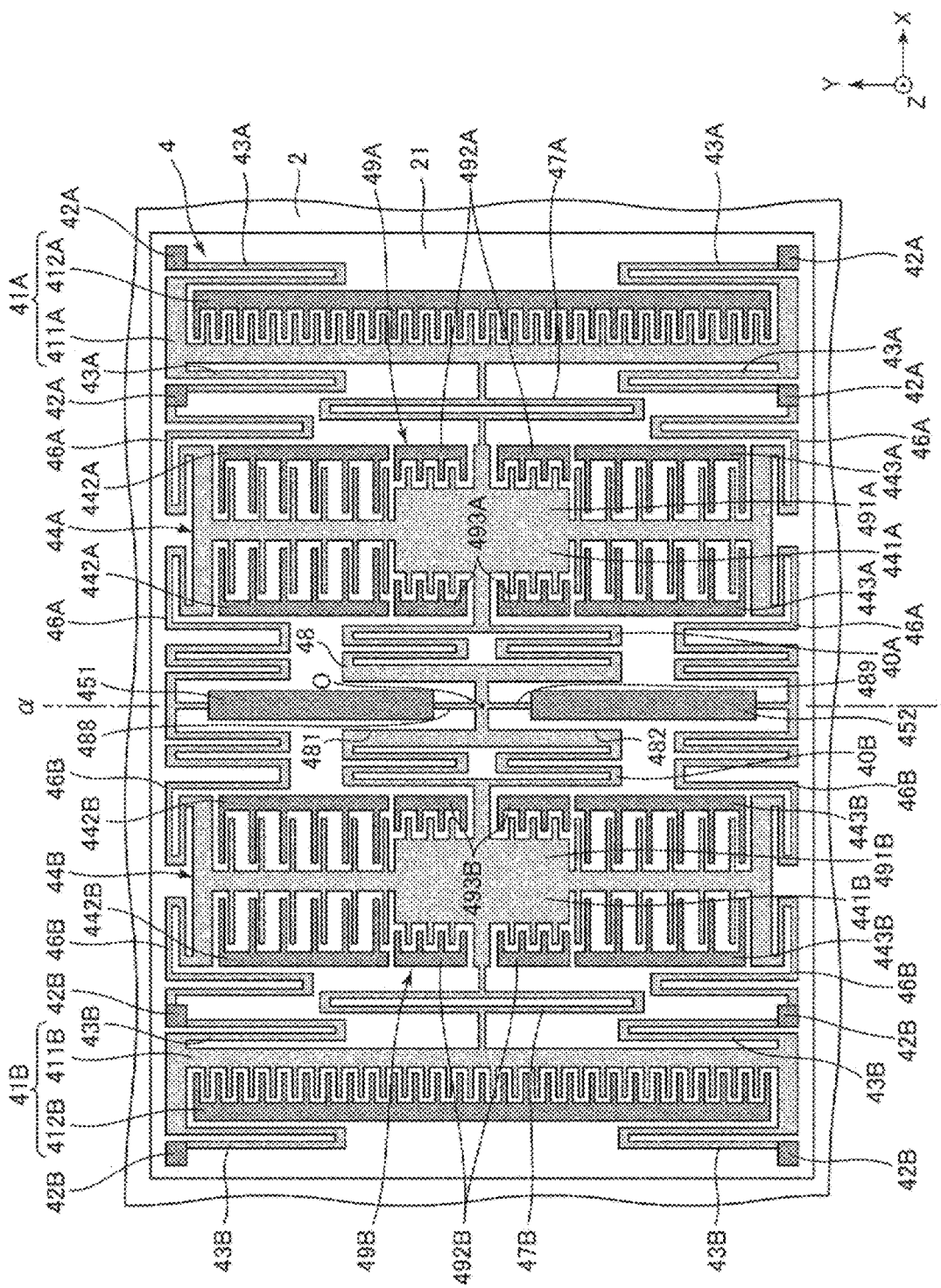
FIG. 3 is a plan view illustrating an element portion included in the physical quantity sensor of FIG. 1.
Figure 4:
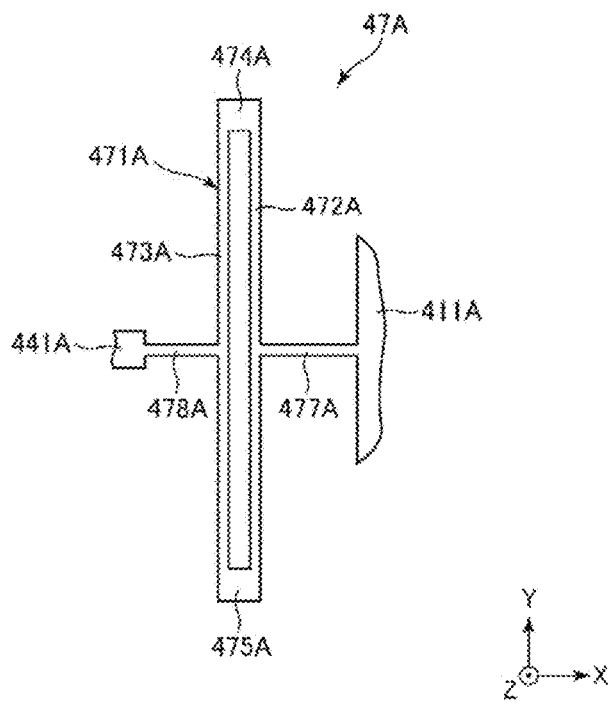
FIG. 4 is an enlarged plan view of a reverse phase spring included in the element portion of FIG. 3.
Figure 5:
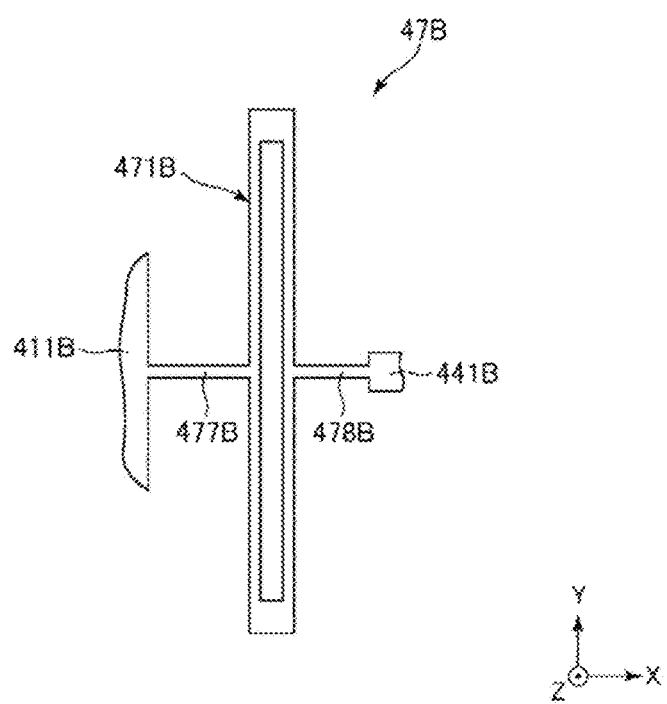
FIG. 5 is another enlarged plan view of the reverse phase spring included in the element portion of FIG. 3.
Figure 6:
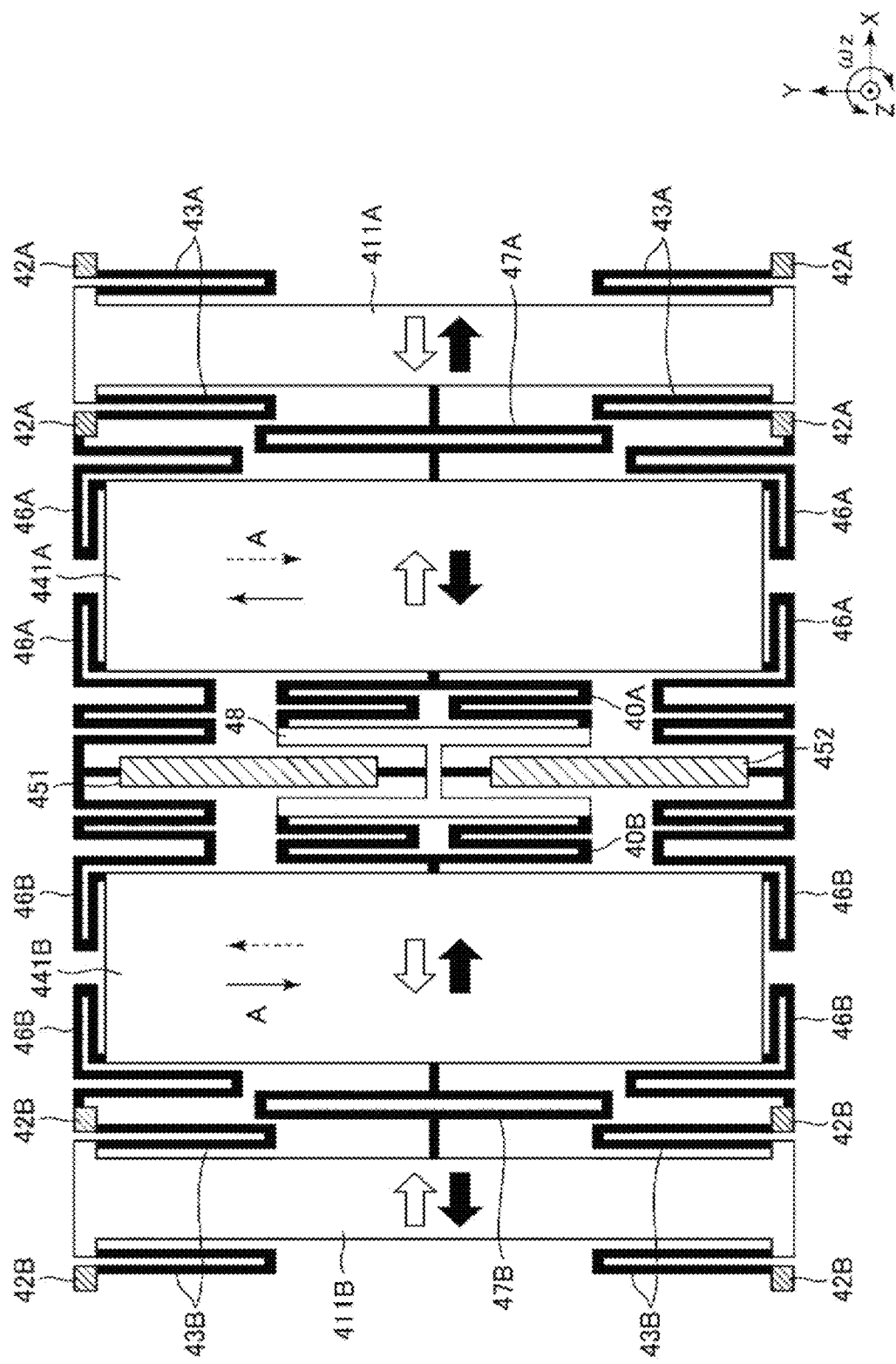
FIG. 6 is a schematic diagram for explaining a vibration mode of the element portion illustrated in FIG. 3.
Figure 7:
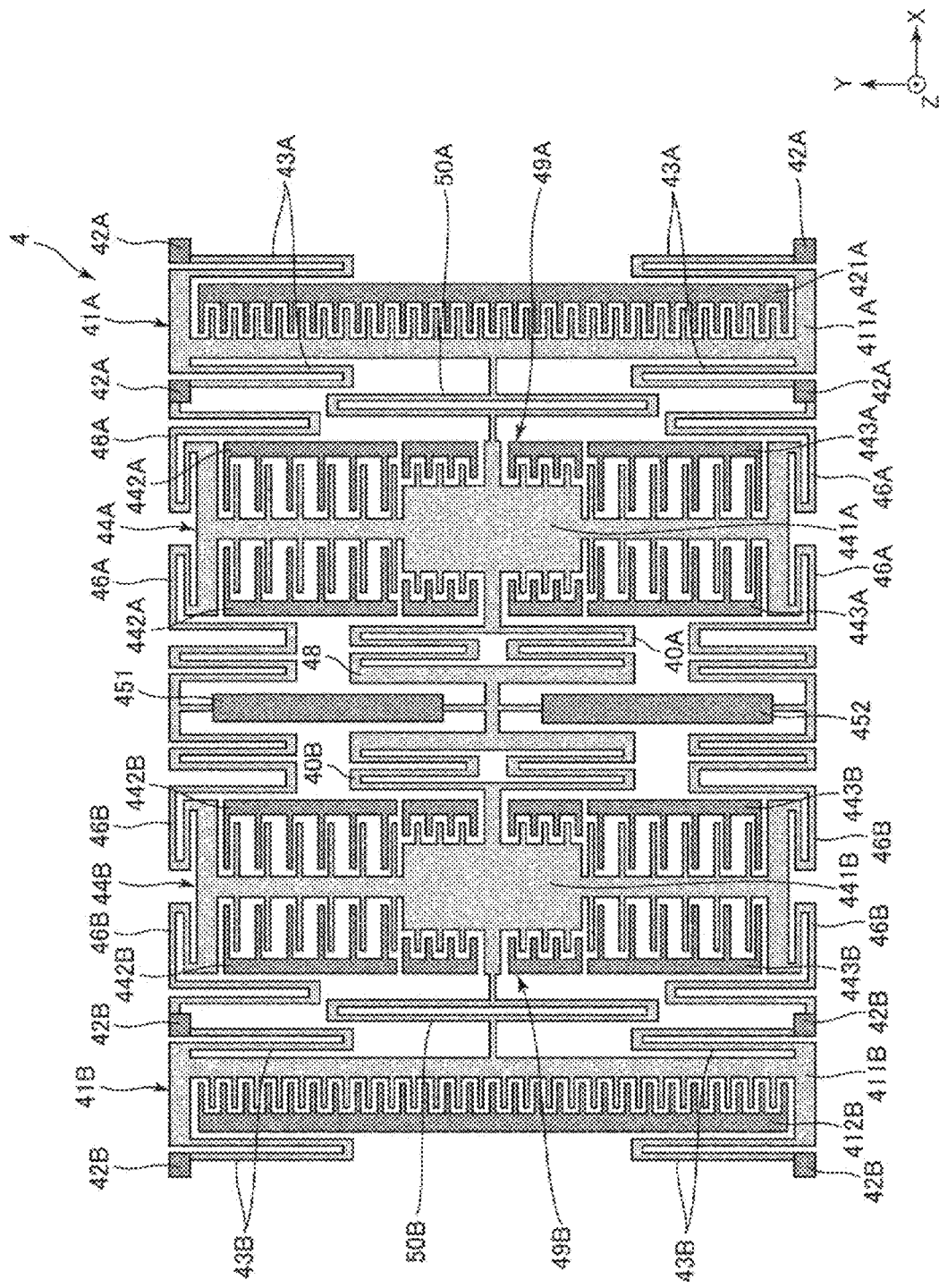
FIG. 7 is a plan view illustrating an element portion used for comparison of Q values.
Figure 8:
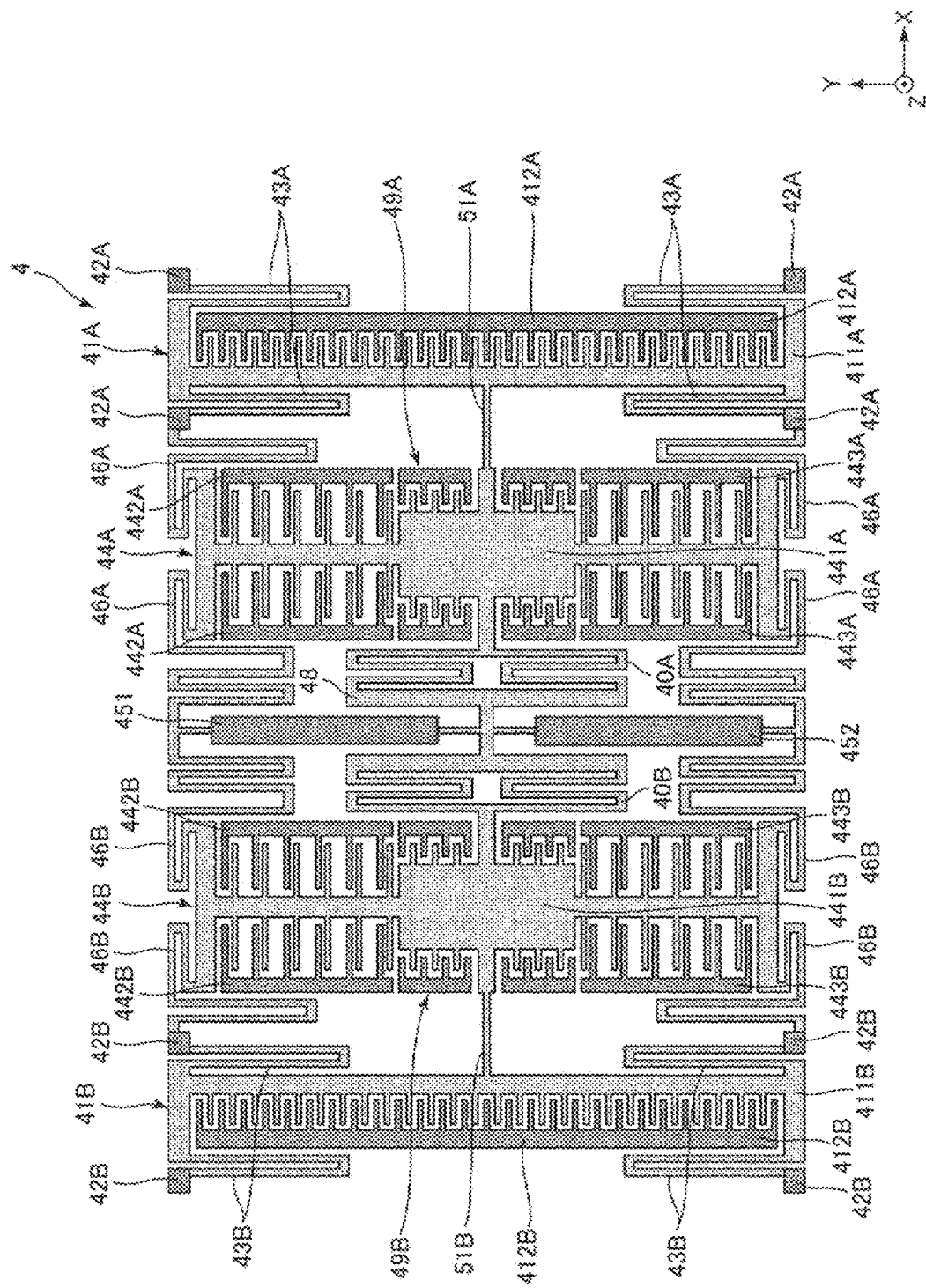
FIG. 8 is another plan view illustrating the element portion used for comparison of Q values.

FIG. 1 is a plan view illustrating a physical quantity sensor according to the first embodiment. FIG. 2 is a cross-sectional view taken along line A-A in FIG. 1. FIG. 3 is a plan view illustrating an element portion included in the physical quantity sensor of FIG. 1. FIG. 4 and FIG. 5 are enlarged plan views of a reverse phase spring included in the element portion of FIG. 3, respectively. FIG. 6 is a schematic diagram for explaining a vibration mode of the element portion illustrated in FIG. 3. FIG. 7 and FIG. 8 are plan views illustrating an element portion used for comparison of Q values, respectively. In each drawing, the X-axis, Y-axis, and Z-axis are illustrated as three axes orthogonal to each other. A direction parallel to the X-axis is referred to as an "X-axis direction", a direction parallel to the Y-axis is referred to as a "Y-axis direction", and a direction parallel to the Z-axis is referred to as a "Z-axis direction". The tip end side of the arrow of each axis is also called "plus side", and the side opposite to the tip end side is also called "minus side". In addition, the plus side in the Z-axis direction is also referred to as "upper", and the minus side in the Z-axis direction is also referred to as "lower".

A physical quantity sensor 1 illustrated in FIG. is an angular velocity sensor capable of detecting an angular velocity $\omega z$ around the Z-axis. The physical quantity sensor 1 includes a substrate 2, a lid 3, and an element portion 4.

As illustrated in FIG. 1, the substrate 2 is formed in a plate shape having a rectangular plan view shape. The substrate 2 includes a concave portion 21 which opens to the upper surface. The concave portion 21 functions as a relief portion for preventing (suppressing) contact between the element portion 4 and the substrate 2. The substrate 2 includes a plurality of mounts 22 (221, 222, 223, 224, and 225) protruding from the bottom surface of the concave portion 21. The element portion 4 is bonded to the upper surface of these mounts 22. With this configuration, the element portion 4 can be fixed to the substrate 2 in a state where contact with the substrate 2 is prevented. The substrate 2 includes grooves 23, 24, 25, 26, 27, and 28 which open to the upper surface.

As the substrate 2, for example, a glass substrate composed of glass materials (for example, borosilicate glass such as Tempax glass (registered trademark), Pyrex glass (registered trademark)) containing movable ions (alkali metal ions, hereinafter represented by Na+) such as sodium ions (Na+), lithium ions (Li+) or the like can be used. With this configuration, for example, as will be described later, the substrate 2 and the element portion 4 can be subjected to anode bonding to be firmly bonded. Further, since the substrate 2 having light transmitting property can be obtained, the state of the element portion 4 can be visually recognized from the outside of the physical quantity sensor 1 via the substrate 2. However, the constituent material of the substrate 2 is not particularly limited, and a silicon substrate, a ceramic substrate, or the like may be used.

As illustrated in FIG. 1, wirings 73, 74, 75, 76, 77, and 78 are disposed in the grooves 23, 24, 25, 26, 27, and 28, respectively. The wirings 73, 74, 75, 76, 77, and are electrically connected to the element portion 4, respectively. One end portions of the wirings 73, 74, 75, 76, 77, and 78 are exposed to the outside of the lid 3, respectively, and function as electrode pads P that make electrical connection with external devices, respectively.

As illustrated in FIG. 1, the lid 3 is in a form of a plate shape having a rectangular plan view shape. As illustrated in FIG. 2, the lid 3 includes a concave portion 31 which opens to the lower surface. The lid 3 is bonded to the upper surface of the substrate 2 so as to accommodate the element portion 4 in the concave portion 31. An accommodation space S for accommodating the element portion 4 is formed inside the lid 3 and the substrate 2.

As illustrated in FIG. 2, the lid 3 includes a communication hole 32 that communicates between the inside and the outside of the accommodation space S. For that reason, it is possible to replace the accommodation space S with a desired atmosphere via the communication hole 32. A sealing member 33 is disposed in the communication hole 32, and the communication hole 32 is hermetically sealed by the sealing member 33. It is preferable that the accommodation space S is in a reduced pressure state, particularly in a vacuum state. With this configuration, the viscous resistance decreases, and the element portion 4 can vibrate efficiently.

As such a lid 3, for example, a silicon substrate can be used. However, the lid 3 is not particularly limited, and for example, a glass substrate or a ceramic substrate may be used. Although a method of bonding the substrate 2 and the lid 3 is not particularly limited and may be appropriately selected depending on materials of the substrate 2 and the lid 3, for example, anodic bonding, active bonding for bonding the bonding surfaces activated by plasma irradiation, bonding with a bonding material such as glass frit, and diffusion bonding for bonding the metal films formed on the upper surface of the substrate 2 and the lower surface of the lid 3 and the like are included. In the first embodiment, the substrate 2 and the lid 3 are bonded via a glass frit 39 (low melting point glass).

The element portion 4 is disposed in the accommodation space S and is bonded to the upper surface of the mount 22. The element portion 4 can be formed by patterning a conductive silicon substrate doped with impurities such as phosphorus (P), boron (B) or the like, by a dry etching method (silicon deep etching). Hereinafter, the element portion 4 will be described in detail. In the following description, a straight line intersecting the center O of the element portion 4 and extending in the Y-axis direction in plan view from the Z-axis direction is also referred to as an "imaginary straight line α".

As illustrated in FIG. 3, the shape of the element portion 4 is symmetrical with respect to an imaginary straight line α. The element portion 4 includes drive portions 41A and 41B disposed on both sides of the imaginary straight line α. The drive portion 41A includes a comb teeth-shaped movable drive electrode 411A and a fixed drive electrode 412A which is in the form of a comb teeth shape and is disposed so as to be engaged with the comb teeth-shaped movable drive electrode 411A. Similarly, the drive portion 41B includes a comb teeth-shaped movable drive electrode 411B and a fixed drive electrode 412B which is in the form of a comb teeth shape and is disposed so as to be engaged with the comb teeth-shaped movable drive electrode 411B.

The fixed drive electrode 412A is positioned outside (side far from the imaginary straight line α) the movable drive electrode 411A, and the fixed drive electrode 412B is positioned outside (side far from the imaginary straight line α) the movable drive electrode 411B. The fixed drive electrodes 412A and 412B are bonded to the upper surface of the mount 221, respectively, and are fixed to the substrate 2. The movable drive electrodes 411A and 411B are electrically connected to the wiring 73, respectively, and the fixed drive electrodes 412A and 412B are electrically connected to the wiring 74, respectively.

The element portion 4 includes four fixed portions 42A disposed around the drive portion 41A and four fixed portions 42B disposed around the drive portion 41B. Each of the fixed portions 42A and 42B is bonded to the upper surface of the mount 222 and fixed to the substrate 2.

The element portion 4 includes four drive springs 43A for connecting the respective fixed portions 42A and the movable drive electrode 411A and four drive springs 43B for connecting the fixed portions 42B and the movable drive electrode 411B. Each of the drive springs 43A is elastically deformed in the X-axis direction so that displacement of the movable drive electrode 411A in the X-axis direction is permitted and each of the drive springs 43B is elastically deformed in the X-axis direction so that displacement of the movable drive electrode 411B in the X-axis direction is permitted.

When a driving voltage is applied between the movable drive electrodes 411A and 411B and the fixed drive electrodes 412A and 412B via the wirings 73 and 74, electrostatic attractive forces are generated between the movable drive electrode 411A and the fixed drive electrode 412A and between the movable drive electrode 411B and the fixed drive electrode 412B, the movable drive electrode 411A vibrates in the X-axis direction while elastically deforming the drive spring 43A in the X-axis direction, and the movable drive electrode 411B vibrates in the X-axis direction while elastically deforming the drive spring 43B in the X-axis direction. Since the drive portions 41A and 41B are disposed symmetrically with respect to the imaginary straight line α, the movable drive electrodes 411A and 411B vibrate in reverse phases in the X-axis direction so as to alternately repeat approaching and separating from each other. For that reason, vibrations of the movable drive electrodes 411A and 411B are canceled, and vibration leakage can be reduced. In the following description, this vibration mode is also referred to as a "drive vibration mode".

In the physical quantity sensor 1 of the first embodiment, although an electrostatic drive method in which the drive vibration mode is excited by electrostatic attractive force is used, the method of exciting the drive vibration mode is not particularly limited, and examples thereof include a piezoelectric drive method, an electromagnetic drive method using a Lorentz force of a magnetic field, and the like can also be applied.

The element portion 4 includes detection portions 44A and 44B disposed between the drive portions 41A and 41B. The detection portion 44A includes a movable detection electrode 441A which is provided with a plurality of electrode fingers disposed in a comb teeth shape and fixed detection electrodes 442A and 443A which are disposed to engage with the electrode fingers of the movable detection electrode 441A provided with the plurality of electrode fingers disposed in a comb teeth shape. The fixed detection electrodes 442A and 443A are disposed to be aligned in the Y-axis direction, the fixed detection electrode 442A is positioned on the plus side in the Y-axis direction and the fixed detection electrode 443A is positioned on the minus side in the Y-axis direction with respect to the center of the movable detection electrode 441A. The fixed detection electrodes 442A and 443A are disposed in pairs so as to sandwich the movable detection electrodes 441A from both sides in the X-axis direction.

The movable detection electrode 441A has a different mass from the movable drive electrode 411A. In the first embodiment, the mass of the movable detection electrode 441A is larger than the mass of the movable drive electrode 411A, but is not limited thereto, and the mass of the movable detection electrode 441A may be equal to the mass of the movable drive electrode 411A or may be smaller than the mass of the movable drive electrode 411A.

The detection portion 44B includes a movable detection electrode 441B which is provided with a plurality of electrode fingers disposed in a comb teeth shape and fixed detection electrodes 442B and 443B which are disposed to engage with the electrode fingers of the movable detection electrode 441B provided with the plurality of electrode fingers disposed in a comb teeth shape. The fixed detection electrodes 442B and 443B are disposed to be aligned in the Y-axis direction, the fixed detection electrode 442B is positioned on the plus side in the Y-axis direction and the fixed detection electrode 443B is positioned on the minus side in the Y-axis direction with respect to the center of the movable detection electrode 441B. The fixed detection electrodes 442B and 443B are disposed in pairs so as to sandwich the movable detection electrodes 441B from both sides in the X-axis direction.

The movable detection electrode 441B has a different mass from the movable drive electrode 411B. In the first embodiment, the mass of the movable detection electrode 441B is larger than the mass of the movable drive electrode 411B, but is not limited thereto, and the mass of the movable detection electrode 441B may be equal to the mass of the movable drive electrode 411B or may be smaller than the mass of the movable drive electrode 411B.

Each of the movable detection electrodes 441A and 441B is electrically connected to the wiring 73, each of the fixed detection electrodes 442A and 443B is electrically connected to the wiring 75, and each of the fixed detection electrodes 443A and 442B is electrically connected to the wiring 76. When the physical quantity sensor 1 is driven, an electrostatic capacitance Ca is formed between the movable detection electrode 441A and the fixed detection electrode 442A and between the movable detection electrode 441B and the fixed detection electrode 443B, and an electrostatic capacitance Cb is formed between the movable detection electrode 441A and the fixed detection electrode 443A and between the movable detection electrode 441B and the fixed detection electrode 442B.

The element portion 4 includes two fixed portions 451 and 452 disposed between the detection portions 44A and 44B. The fixed portions 451 and 452 are respectively bonded to the upper surface of the mount 224 and fixed to the substrate 2. The fixed portions 451 and 452 are aligned in the Y-axis direction and is disposed to be spaced apart from each other. In the first embodiment, the movable drive electrodes 411A and 411B and the movable detection electrodes 441A and 441B are electrically connected to the wiring 73 via the fixed portions 451 and 452.

The element portion 4 includes four detection springs 46A for connecting the movable detection electrode 441A and the fixed portions 42A, 451, and 452, and four detection springs 46B for connecting the movable detection electrode 441B and the fixed portions 42B, 451, and 452. Each of the detection springs 46A is elastically deformed in the X-axis direction so that displacement of the movable detection electrode 441A in the X-axis direction is permitted and each of the detection springs 46A is elastically deformed in the Y-axis direction so that displacement of the movable detection electrode 441A in the Y-axis direction is permitted. Similarly, each of the detection springs 46B is elastically deformed in the X-axis direction so that displacement of the movable detection electrode 441B in the X-axis direction is permitted and each of the detection springs 46B is elastically deformed in the Y-axis direction so that displacement of the movable detection electrode 441B in the Y-axis direction is permitted.

The element portion 4 includes a reverse phase spring 47A which is positioned between the drive portion 41A and the detection portion 44A and connects the movable drive electrode 411A and the movable detection electrode 441A, and a reverse phase spring 47B which is positioned between the drive portion 41B and the detection portion 44B and connects the movable drive electrode 411B and the movable detection electrode 441B. The reverse phase spring 47A is elastically deformed in the X-axis direction, so that the movable detection electrode 441A can be displaced in the X-axis direction with respect to the movable drive electrode 411A. Similarly, the reverse phase spring 47B is elastically deformed in the X-axis direction, so that the movable detection electrode 441B can be displaced in the X-axis direction with respect to the movable drive electrode 411B.

As illustrated in FIG. 4, the reverse phase spring 47A includes a spring main body 471A, a beam 477A connecting the spring main body 471A and the movable drive electrode 411A, and a beam 478A connecting the spring main body 471A and the movable detection electrode 441A. The spring main body 471A includes an arm 472A which has a shape extending in the Y-axis direction and elastically deformable in the X-axis direction and an arm 473A which has a shape extending in the Y-axis direction and elastically deformable in the X-axis direction. The arms 472A and 473A are disposed to be spaced apart by a gap in the X-axis direction, the beam 477A is connected to the central portion of the arm 472A, and the beam 478A is connected to the central portion of the arm 473A. The spring main body 471A includes a connection portion 474A connecting one ends of the arms 472A and 473A to each other and a connection portion 475A connecting the other ends of the arms 472A, 473A to each other. Accordingly, the spring main body 471A has a frame-like shape with a central portion opened.

As illustrated in FIG. 5, the reverse phase spring 47B has the same configuration as that of the reverse phase spring 47A, and includes a spring main body 471B, a beam 477B connecting the spring main body 471B and the movable drive electrode 411B, and a beam 478B connecting the spring main body 471B and the movable detection electrode 441B.

Here, as illustrated in FIG. 6, in the drive vibration mode, since vibration of the movable drive electrode 411A is transmitted to the movable detection electrode 441A via the reverse phase spring 47A, the movable detection electrode 441A vibrates in the X-axis direction in conjunction with vibration of the movable drive electrode 411A. Similarly, since vibration of the movable drive electrode 411B is transmitted to the movable detection electrode 441B via the reverse phase spring 47B, the movable detection electrode 441B vibrates in the X-axis direction in conjunction with the vibration of the movable drive electrode 411B. As described above, since the movable drive electrodes 411A and 411B vibrate in reverse phases in the X-axis direction, the movable detection electrodes 441A and 441B also vibrate in reverse phases in the X-axis direction so as to alternately repeat approaching and separating from each other. For that reason, the vibrations of the movable detection electrodes 441A and 441B are canceled, and vibration leakage to the substrate 2 can be reduced.

Furthermore, in the drive vibration mode, the movable detection electrode 441A vibrates in reverse phase in the X-axis direction so as to alternately repeat approaching and separating from the movable drive electrode 411A by using elastic deformation of the reverse phase spring 47A. Similarly, the movable detection electrode 441B vibrates in reverse phase in the X-axis direction so as to alternately repeat approaching and separating from the movable drive electrode 411B by using elastic deformation of the reverse phase spring 47B. With this configuration, at least a portion of the vibrations of the movable detection electrode 441A and the movable drive electrode 411A is canceled and at least a portion of the vibrations of the movable detection electrode 441B and the movable drive electrode 411B is canceled. Accordingly, as compared with a case where the movable detection electrode 441A and the movable drive electrode 411A and the movable detection electrode 441B and the movable drive electrode 411B vibrate in the same phase, it is possible to more effectively reduce vibration leakage to the substrate 2. In order to vibrate the movable detection electrode 441A and the movable drive electrode 411A in reverse phases in the drive vibration mode, for example, the spring constant of the reverse phase spring 47A positioned therebetween may be adjusted, and in order to vibrate the movable detection electrode 441B and the movable drive electrode 411B in reverse phases, for example, the spring constant of the reverse phase spring 47B positioned therebetween may be adjusted.

The larger the difference between the resonance frequency f1 in the reverse phase mode in which the movable detection electrode 441A and the movable drive electrode 411A, and the movable detection electrode 441B and the movable drive electrode 411B vibrate in reverse phases, respectively, and the resonance frequency f2 in the in-phase mode in which the movable detection electrode 441A and the movable drive electrode 411A, and the movable detection electrode 441B and the movable drive electrode 411B vibrate in the same phase, respectively, the easier it is to vibrate in the reverse phase mode, and the harder the in-phase mode is to be coupled (that is, the reverse phase mode becomes dominant). Specifically, for example, in a case where the resonance frequency f1 in the reverse phase mode is about 30 kHz, the resonance frequency f2 in the in-phase mode is preferably separated from the resonance frequency by 3 kHz or more (that is, 10% or more). With this configuration, it is difficult for the in-phase mode to be sufficiently coupled, and it is possible to more stably drive in the reverse phase mode.

The expression "vibrating the movable detection electrode 441A (441B) and the movable drive electrode 411A (411B) in a reverse phase" means not only the case where vibrations other than vibration in the reverse phase mode are not coupled, but also the case where if the reverse phase mode is dominant, other vibration modes (for example, the in-phase mode described above) may be coupled. Further, for example, not only the case where there is no phase difference between vibrations of the movable detection electrode 441A and the movable drive electrode 411A but also the case where there is a phase difference between the vibrations are included. The case where there is no phase difference means, for example, that the time when the movable drive electrode 411A is displaced to the plus side in the X-axis direction coincides with the time when the movable detection electrode 441A displaces toward the minus side in the X-axis direction. Further, the case where there is a phase difference means, for example, that the movable detection electrode 441A is displaced to the minus side in the X-axis direction from the time after the time when the movable drive electrode 411A is displaced to the plus side in the X-axis direction.

When the angular velocity ωz is applied to the physical quantity sensor 1 during driving in the drive vibration mode as described above, the movable detection electrodes 441A and 441B vibrate (this vibration is also referred to as "detection vibration mode") in reverse phases in the Y-axis direction while elastically deforming the detection springs 46A and 46B in the Y-axis direction as indicated by an arrow A in FIG. 6 by the Coriolis force. In the detection vibration mode, since the movable detection electrodes 441A and 441B vibrate in the Y-axis direction, the gap between the movable detection electrode 441A and the fixed detection electrodes 442A and 443A and the gap between the movable detection electrode 441B and the fixed detection electrodes 442B and 443B change and the electrostatic capacitances Ca and Cb change, respectively, accompanying the gap change. For that reason, the angular velocity ωz can be obtained based on changes in the electrostatic capacitances Ca and Cb.

In the detection vibration mode, when the electrostatic capacitance Ca increases, the electrostatic capacitance Cb decreases, and on the contrary, when the electrostatic capacitance Ca decreases, the electrostatic capacitance Cb increases. For that reason, by performing difference computation (subtraction processing: Ca−Cb) between a detection signal (signal corresponding to magnitude of the electrostatic capacitance Ca) output from a QV amplifier connected to the wiring 75 and a detection signal (signal corresponding to magnitude of the electrostatic capacitance Cb) output from the QV amplifier connected to the wiring 76, noise can be canceled, and the angular velocity ωz can be detected more accurately.

Here, in the drive vibration mode, amplitude of the movable detection electrode 441A becomes larger than amplitude of the movable drive electrode 411A due to expansion and contraction of the reverse phase spring 47A, and amplitude of the movable detection electrode 441B becomes larger than amplitude of the movable drive electrode 411B due to expansion and contraction of the reverse phase spring 47B. For that reason, it is possible to increase the amplitudes of the movable detection electrodes 441A and 441B in the drive vibration mode, so that a larger Coriolis force acts by an amount of amplitude increase. Accordingly, detection sensitivity of the angular velocity ωz is improved. Since the movable detection electrodes 441A and 441B can be vibrated greatly with a small driving force, power consumption can be reduced.

Further, as illustrated in FIG. 3, the element portion 4 includes a frame 48 positioned at the center portion (between detection portions 44A and 44B) thereof. The frame 48 has an "H" shape and includes a defective portion 481 (concave portion) positioned on the plus side in the Y-axis direction and a defective portion 482 (concave portion) positioned on the minus side in the Y-axis direction. A fixed portion 451 is disposed inside and outside of the defective portion 481, and the fixed portion 452 is disposed inside and outside the defective portion 482. With this configuration, the fixed portions 451 and 452 can be formed long in the Y-axis direction, a bonding area with the substrate 2 is increased correspondingly, and bonding strength between the substrate 2 and the element portion 4 is increased.

The element portion 4 includes a frame spring 488 which is positioned between the fixed portion 451 and the frame 48 and connects these components, and a frame spring 489 which is positioned between the fixed portion 452 and the frame 48 and connects these components.

The element portion 4 includes a connection spring 40A which is positioned between the frame 48 and the movable detection electrode 441A and connects these components and a connection spring 40B which is positioned between the frame 48 and the movable detection electrode 441B and connects these components. The connection spring 40A supports the movable detection electrode 441A together with the detection spring 46A, and the connection spring 40B supports the movable detection electrode 441B together with the detection spring 46B. For that reason, the movable detection electrodes 441A and 441B can be supported in a stable attitude, and unnecessary vibration (spurious) of the movable detection electrodes 441A and 441B can be reduced.

In the drive vibration mode, the elastic deformation of the connection springs 40A and 40B is performed so that vibration of the movable bodies 4A and 4B is permitted, and in the detection vibration mode, the connection springs 40A and 40B and the frame springs 488 and 489 are elastically deformed and the frame 48 is rotated about the center O, so that vibration of the movable detection electrodes 441A and 441B in the Y-axis direction is permitted.

The element portion 4 includes monitor portions 49A and 49B for detecting vibration states of the movable drive electrodes 411A and 411B in the drive vibration mode. The monitor portion 49A includes a movable monitor electrode 491A disposed on the movable detection electrode 441A and provided with a plurality of electrode fingers disposed in a comb teeth shape, and fixed monitor electrodes 492A and 493A which are provided with a plurality of electrode fingers disposed in a comb teeth shape and disposed to be engaged with the electrode fingers of the movable monitor electrode 491A. The fixed monitor electrode 492A is positioned on the plus side in the X-axis direction with respect to the movable monitor electrode 491A and the fixed monitor electrode 493A is positioned on the minus side in the X-axis direction with respect to the movable monitor electrode 491A.

Similarly, the monitor portion 49B includes a movable monitor electrode 491B disposed on the movable detection electrode 441B and provided with a plurality of electrode fingers disposed in a comb teeth shape, and fixed monitor electrodes 492B and 493B which are provided with a plurality of electrode fingers disposed in a comb teeth shape and disposed to be engaged with the electrode fingers of the movable monitor electrode 491B. The fixed monitor electrode 492B is positioned on the minus side in the X-axis direction with respect to the movable monitor electrode 491B and the fixed monitor electrode 493B is positioned on the plus side in the X-axis direction with respect to the movable monitor electrode 491B.

These fixed monitor electrodes 492A, 493A, 492B, and 493B are bonded to the upper surface of the mount 225, respectively, and fixed to the substrate 2. The movable monitor electrodes 491A and 491B are electrically connected to the wiring 73, respectively, the fixed monitor electrodes 492A and 492B are electrically connected to the wiring 77, respectively, and the fixed monitor electrodes 493A and 493B are electrically connected to the wiring 78, respectively. The wirings 77 and 78 are connected to the QV amplifier (electric charge voltage conversion circuit), respectively. When the physical quantity sensor 1 is driven, an electrostatic capacitance Cc is formed between the movable monitor electrode 491A and the fixed monitor electrode 492A and between the movable monitor electrode 491B and the fixed monitor electrode 492B and an electrostatic capacitance Cd is formed between the movable monitor electrode 491A and the fixed monitor electrode 493A and the movable monitor electrode 491B and the fixed monitor electrode 493B.

As described above, in the drive vibration mode, since the movable detection electrodes 441A and 441B vibrate in the X-axis direction, the gap between the movable monitor electrode 491A and the fixed monitor electrodes 492A and 493A and the gap between the movable monitor electrode 491B and the fixed monitor electrodes 492B and 493B change, respectively, and the electrostatic capacitances Cc and Cd change, respectively, according to the gap changes. For that reason, it is possible to detect the vibration state (in particular, amplitude in the X-axis direction) of the movable bodies 4A and 4B based on changes in the electrostatic capacitances Cc and Cd.

In the drive vibration mode, when the electrostatic capacitance Cc increases, the electrostatic capacitance Cd decreases, and on the contrary, when the electrostatic capacitance Cc decreases, the electrostatic capacitance Cd increases. For that reason, by performing difference computation (subtraction processing: Cc−Cd) between a detection signal (signal corresponding to magnitude of the electrostatic capacitance Cc) output from the QV amplifier connected to the wiring 77 and a detection signal (signal corresponding to magnitude of the electrostatic capacitance Cd) output from the QV amplifier connected to the wiring 78, noise can be canceled and the vibration state of the movable bodies 4A and 4B can be detected more accurately.

The vibration state (amplitude) of the movable bodies 4A and 4B detected using the outputs from the monitor portions 49A and 49B is fed back to a drive circuit that applies a voltage V2 to the movable bodies 4A and 4B. The drive circuit changes the frequency and the duty ratio of the voltage V2 so that amplitudes of the movable bodies 4A and 4B become target values. With this configuration, the movable bodies 4A and 4B can be more reliably vibrated at a predetermined amplitude, and detection accuracy of the angular velocity ωz is improved.

The physical quantity sensor 1 has been described as above. As described above, the physical quantity sensor 1 includes the movable drive electrodes 411A and 411B (drive vibrator), the movable detection electrodes 441A and 441B (detection vibrator), the reverse phase spring 47A (elastic deformation portion) which is disposed between the movable drive electrode 411A and the movable detection electrode 441A in plan view and is elastically deformable in the X-axis direction (first direction) in which the movable drive electrode 411A and the movable detection electrode 441A are aligned, and the reverse phase spring 47B (elastic deformation portion) which is disposed between the movable drive electrode 411B and the movable detection electrode 441B in plan view and is elastically deformable in the X-axis direction (first direction) in which the movable drive electrode 411B and the movable detection electrode 441B are aligned. Then, the movable drive electrode 411A and the movable detection electrode 441A vibrate in reverse phases in the X-axis direction, and the movable drive electrode 411B and the movable detection electrode 441B vibrate in reverse phases in the X-axis direction. That is, the movable drive electrode 411A and the movable detection electrode 441A vibrate so as to alternately repeat approaching and separating from each other in the X-axis direction, and the movable drive electrode 411B and the movable detection electrode 441B vibrate so as to alternately repeat approaching and separating from each other in the X-axis direction.

With this configuration, at least a portion of the vibrations of the movable detection electrode 441A and the movable drive electrode 411A is canceled and at least a portion of the vibrations of the movable detection electrode 441B and the movable drive electrode 411B is canceled. Accordingly, as compared with the case where the movable detection electrode 441A and the movable drive electrode 411A and the movable detection electrode 441B and the movable drive electrode 411B vibrate in the same phase, it is possible to more effectively reduce vibration leakage to the substrate 2. For that reason, the decrease in the Q value is suppressed, and the physical quantity sensor 1 having excellent vibration characteristics is obtained.

Here, a comparison result of the Q value of the physical quantity sensor 1 of the first embodiment with the Q value of another configuration is illustrated. As in the first embodiment, Sample 1 illustrated in the following Table 1 has a configuration in which the reverse phase springs 47A and 47B are included and the movable drive electrode 411A and the movable detection electrode 441A and the movable drive electrode 411B and the movable detection electrode 441B respectively vibrate in reverse phase in the X-axis direction. As illustrated in FIG. 7, sample 2 has a configuration in which in-phase springs 50A and 50B are included and the movable drive electrode 411A and the movable detection electrode 441A and the movable drive electrode 411B and the movable detection electrode 441B, respectively vibrate in the same phase in the X-axis direction. As illustrated in FIG. 8, Sample 3 has a configuration in which beams 51A and 51B that do not substantially elastically deform in the X-axis direction are included and the movable drive electrode 411A and the movable detection electrode 441A, the movable drive electrode 411B and the movable detection electrode 441B vibrate in the same phase in the X-axis direction. From Table 1, it can be seen that the Q value of Sample 1 is larger than the Q value of Samples 2 and 3. For that reason, it is clear that the effect described above can be exhibited.

TABLE 1

| | sample | | |
|---|---|---|---|
| | 1 | 2 | 3 |
| Q value | 170,000 | 140,000 | 140,000 |

As described above, in the physical quantity sensor 1, the mass of the movable drive electrode 411A is different from the mass of the movable detection electrode 441A, and the mass of the movable drive electrode 411B is different from the mass of the movable detection electrode 441B. With this configuration, it becomes easier to adjust the amplitudes of the movable detection electrodes 441A and 441B. In particular, in the first embodiment, the mass of the movable drive electrodes 411A and 411B is smaller than the mass of the movable detection electrodes 441A and 441B. For that reason, inertia of the movable drive electrodes 411A and 411B can be enhanced, and the amplitudes of the movable drive electrodes 411A and 411B can be increased.

Further, as described above, in the physical quantity sensor 1, the amplitude at which the movable detection electrodes 441A and 441B vibrate in the X-axis direction is larger than the amplitude at which the movable drive electrodes 411A and 411B vibrate in the X-axis direction. For that reason, the Coriolis force acting on the movable detection electrodes 441A and 441B can be increased, and detection sensitivity of the angular velocity ωz is improved.

As described above, in the physical quantity sensor 1, the reverse phase spring 47A (elastic deformation portion) includes the spring main body 471A (elastic deformation portion main body), the beam 477A (first beam) connecting the spring main body 471A and the movable drive electrode 411A, and the beam 478A (second beam) connecting the spring main body 471A and the movable detection electrode 441A. Similarly, the reverse phase spring 47B (elastic deformation portion) includes the spring main body 471B (elastic deformation portion main body), the beam 477B (first beam) connecting the spring main body 471B and the movable drive electrode 411B, and the beam 478B (second beam) connecting the spring main body 471B and the movable detection electrode 441B. With this configuration, the configuration of the reverse phase springs 47A and 47B becomes relatively simple.

As described above, in the physical quantity sensor 1, the spring main body 471A includes the arm 472A (first arm) of which the longitudinal direction is along the Y-axis direction (second direction orthogonal to the X-axis direction) and which is elastically deformable in the X-axis direction, the arm 473A (second arm) of which the longitudinal direction is along the Y-axis, which is disposed to be spaced apart from the arm 472A by a gap in the X-axis direction, and which is elastically deformable in the X-axis direction, the connection portion 474A (first connection portion) connecting the one end sides of the arm 472A and the arm 473A with each other, and the connection portion 475A (second connection portion) connecting the other end sides of the arm 472A and the arm 473A with each other. The same applies to the spring main body 471B. With this configuration, the configuration of the spring main bodies 471A and 471B becomes relatively simple and sufficient elasticity in the X-axis direction is obtained with the configuration.

As described above, in the physical quantity sensor 1, the reverse phase springs 47A and 47B have a spring shape. With this configuration, the configuration of the reverse phase springs 47A and 47B becomes simple.

Second Embodiment

Next, a physical quantity sensor according to a second embodiment will be described.

Figure 9:
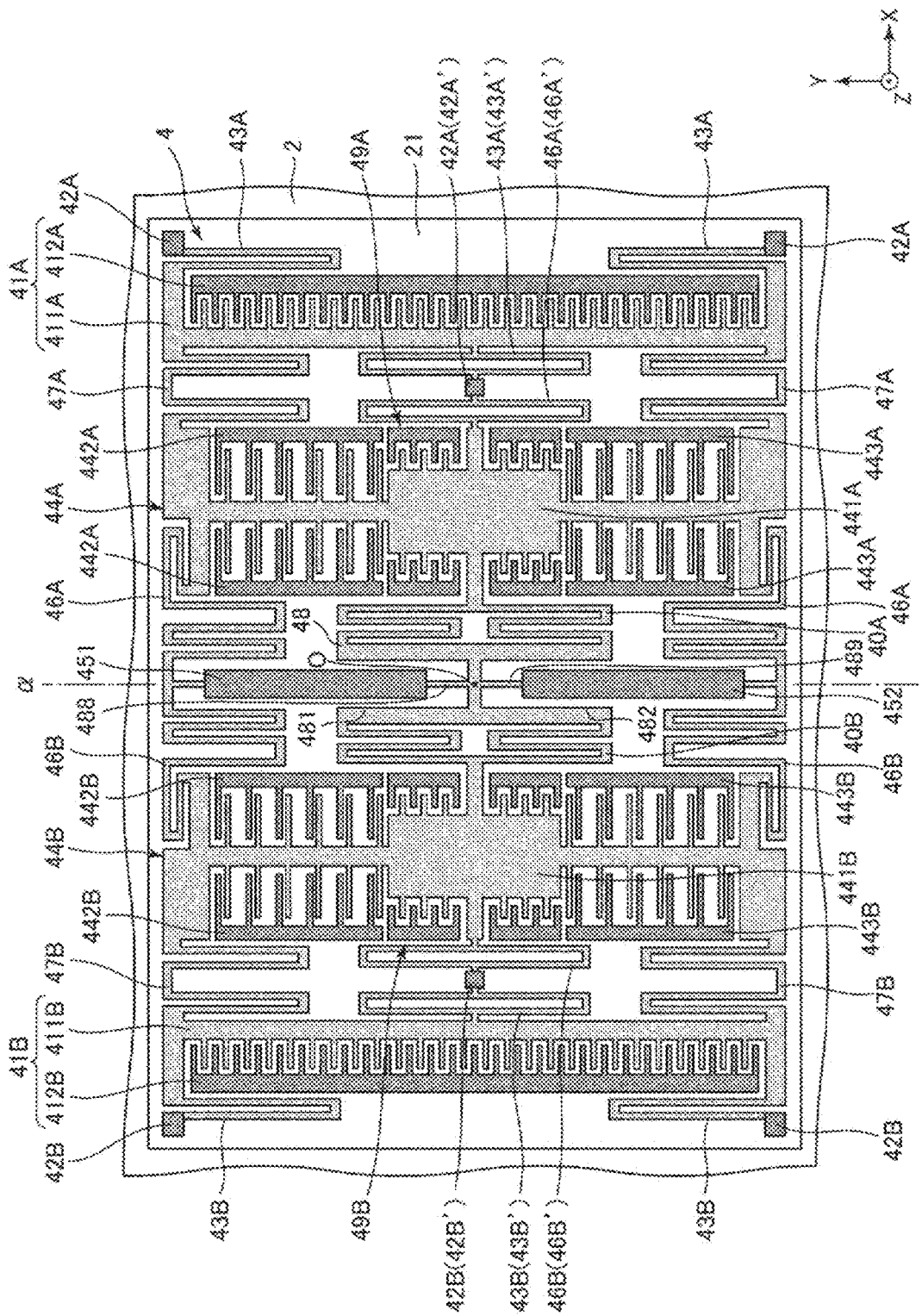
FIG. 9 is a plan view illustrating an element portion of a physical quantity sensor according to a second embodiment.

FIG. 9 is a plan view illustrating an element portion of a physical quantity sensor according to a second embodiment.

The physical quantity sensor 1 according to the second embodiment is the same as the physical quantity sensor 1 according to the first embodiment described above except that the configuration of the element portion 4 is mainly different.

In the following description, regarding the physical quantity sensor 1 of the second embodiment, description will be mainly made on the differences from the first embodiment described above, and description of same matters will be omitted. In FIG. 9, the same reference numerals are given to the same configurations as those of the first embodiment described above.

As illustrated in FIG. 9, in the element portion 4 of the second embodiment, a pair of reverse phase springs 47A is disposed. One of the reverse phase springs 47A connects the ends of the movable drive electrode 411A and the movable detection electrode 441A on the plus side in the Y-axis direction to each other and the other reverse phase spring 47A connects the ends of the movable drive electrode 411A and the movable detection electrode 441A on the minus side in the Y-axis direction to each other. Further, the fixed portion 42A (42A'), the drive spring 43A (43A') for connecting the fixed portion 42A' and the movable drive electrode 411A, and the detection spring 46A (46A') for connecting the fixed portion 42A' and the movable detection electrode 441A are disposed between the pair of reverse phase springs 47A.

Similarly, in the element portion 4 of the second embodiment, a pair of reverse phase springs 47B is disposed. One of the reverse phase springs 47B connects the ends of the movable drive electrode 411B and the movable detection electrode 441B on the plus side in the Y-axis direction to each other and the other reverse phase spring 47B connects the ends of the movable drive electrode 411B and the movable detection electrode 441B on the minus side in the Y-axis direction to each other. Further, the fixed portion 42B (42B'), the drive spring 43B (43B') for connecting the fixed portion 42B' and the movable drive electrode 411B, and the detection spring 46B (46B') for connecting the fixed portion 42B' and the movable detection electrode 441B are disposed between the pair of reverse phase springs 47B.

According to such a configuration, the fixed portions 42A and 42B can be disposed near the center O of the element portion 4, as compared with the configuration of the first embodiment described above, for example. For that reason, it becomes difficult for external stress to be transmitted to the element portion 4, so that it is possible to suppress a decrease in detection accuracy of the angular velocity ωz.

The physical quantity sensor 1 of the second embodiment has been described as above. Even with such a second embodiment, it is possible to achieve the same effects as those of the first embodiment described above.

Third Embodiment

Next, a physical quantity sensor according to a third embodiment will be described.

Figure 10:
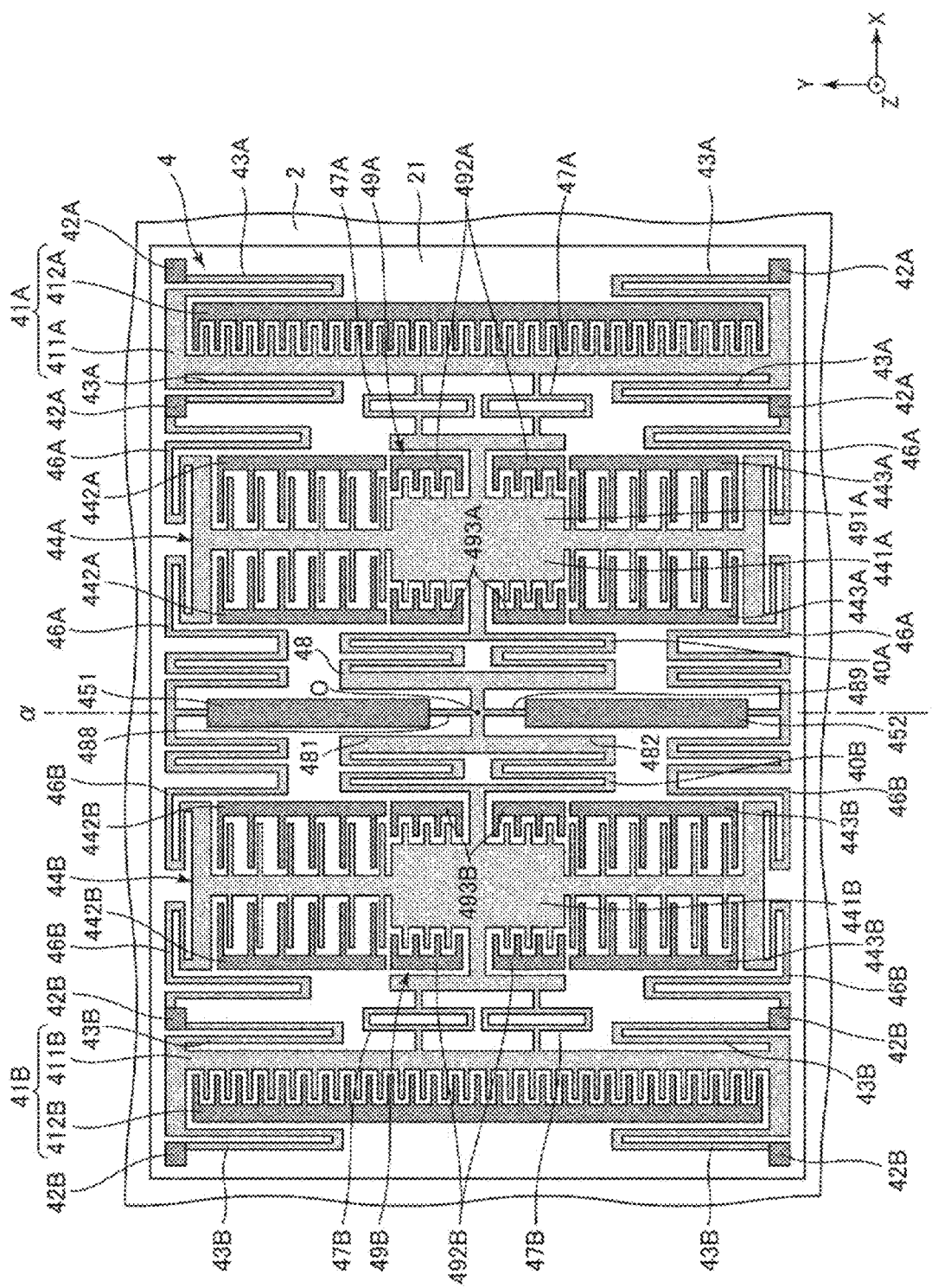
FIG. 10 is a plan view illustrating an element portion of a physical quantity sensor according to a third embodiment.

FIG. 10 is a plan view illustrating an element portion of a physical quantity sensor according to a third embodiment.

The physical quantity sensor 1 according to the third embodiment is the same as the physical quantity sensor 1 according to the first embodiment described above except that the configuration of the element portion 4 is mainly different.

In the following description, regarding the physical quantity sensor 1 of the third embodiment, description will be mainly made on the differences from the first embodiment described above, and description of same matters will be omitted. In FIG. 10, the same reference numerals are given to the same configurations as those of the first embodiment described above.

As illustrated in FIG. 10, in the element portion 4 of the third embodiment, two reverse phase springs 47A are disposed to be aligned in the Y-axis direction between the movable drive electrode 411A and the movable detection electrode 441A. That is, the element portion 4 includes the plurality of reverse phase springs 47A. According to such a configuration, as compared with the configuration of the first embodiment, it is possible to relieve stress concentration on the connection portion between the reverse phase spring 47A and the movable drive electrode 411A and stress concentration on the connection portion between the reverse phase spring 47A and the movable detection electrode 441A by an amount corresponding to the larger number of the reverse phase springs 47A. For that reason, it is possible to enhance impact resistance of the physical quantity sensor 1. Further, since the number of places where the movable drive electrode 411A and the movable detection electrode 441A are supported is increased, the movable drive electrode 411A and the movable detection electrode 441A can be more stably vibrated in the X-axis direction in the drive vibration mode.

Similarly, in the element portion 4 of the third embodiment, two reverse phase springs 47B are disposed to be aligned in the Y-axis direction between the movable drive electrode 411B and the movable detection electrode 441B. That is, the element portion 4 includes the plurality of reverse phase springs 47B. According to such a configuration, the same effect as that of the reverse phase spring 47A described above can be exhibited.

The physical quantity sensor 1 of the third embodiment has been described as above. Even with such a third embodiment, the same effects as those of the first embodiment described above can be exhibited. In the third embodiment, although the element portion 4 includes two reverse phase springs 47A, the number of the reverse phase springs 47A is not limited thereto, and may be three or more. The same applies to the number of reverse phase springs 47B.

Fourth Embodiment

Next, a physical quantity sensor according to a fourth embodiment will be described.

Figure 11:
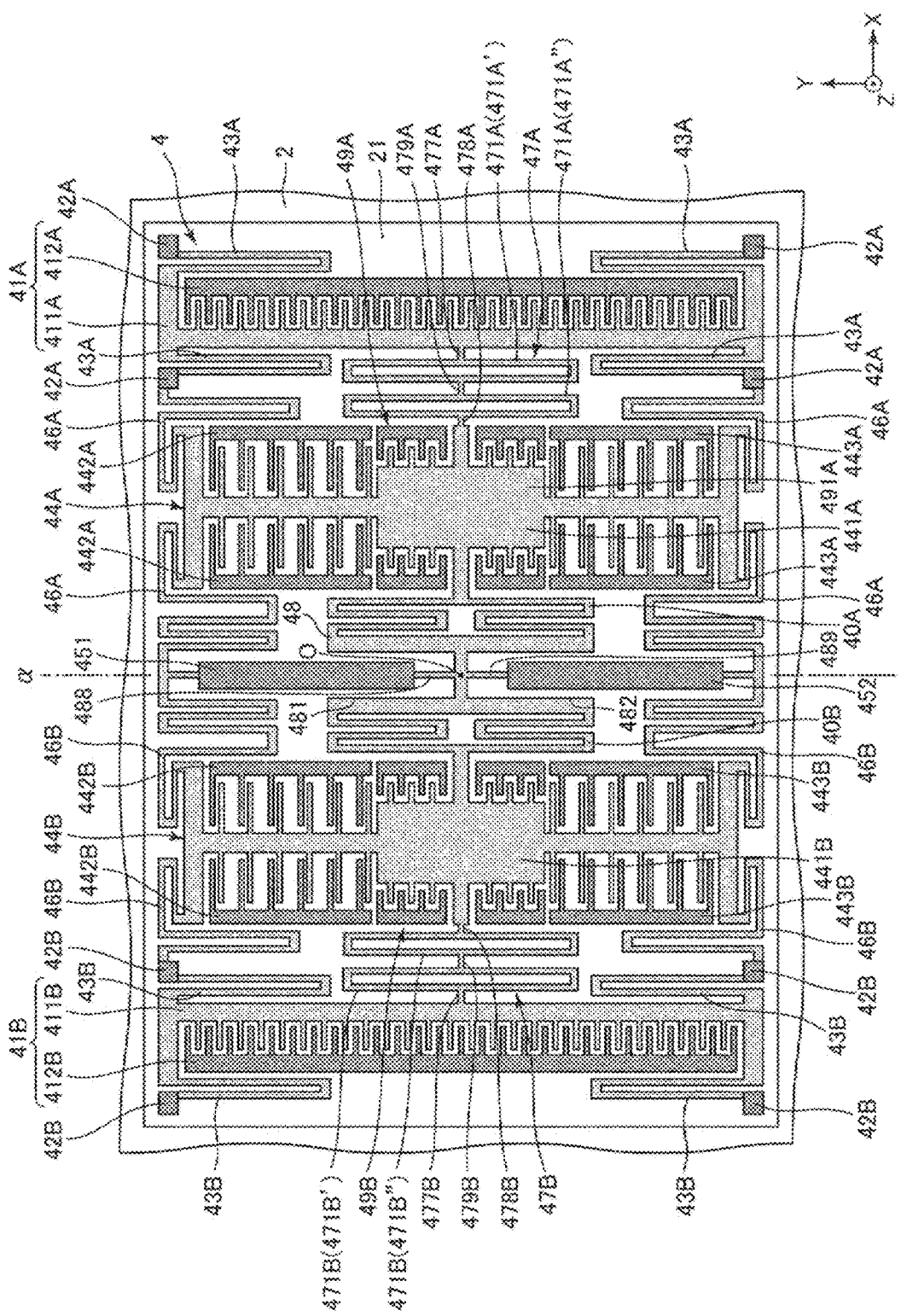
FIG. 11 is a plan view illustrating an element portion of a physical quantity sensor according to a fourth embodiment.

FIG. 11 is a plan view illustrating an element portion of a physical quantity sensor according to a fourth embodiment.

The physical quantity sensor 1 according to the fourth embodiment is the same as the physical quantity sensor 1 according to the first embodiment described above except that the configuration of the element portion 4 is mainly different.

In the following description, regarding the physical quantity sensor 1 of the fourth embodiment, description will be mainly made on the differences from the first embodiment described above, and description of same matters will be omitted. In FIG. 11, the same reference numerals are given to the same configurations as those of the first embodiment described above.

As illustrated in FIG. 11, in the element portion 4 of the fourth embodiment, the reverse phase spring 47A includes two spring main bodies 471A. Specifically, the reverse phase spring 47A includes two spring main bodies 471A (471A' and 471A") disposed to be spaced apart by a gap in the X-axis direction, the beam 477A connecting the spring main body 471A' and the movable drive electrode 411A, the beam 478A connecting the spring main body 471A" and the movable detection electrode 441A, and the beam 479A connecting the spring main bodies 471A' and 471A" to each other. That is, the reverse phase spring 47A includes a plurality of spring main bodies 471A disposed in series. According to such a configuration, as compared with the configuration of the first embodiment, a deformation amount of the reverse phase spring 47A in the X-axis direction can be increased by an amount corresponding to the larger number of the spring main bodies 471A. For that reason, in the drive vibration mode, the amplitude of the movable detection electrode 441A in the X-axis direction is increased, and the detection sensitivity of the angular velocity ωz is improved.

Similarly, in the element portion 4 of the fourth embodiment, the reverse phase spring 47B includes two spring main bodies 471B. Specifically, the reverse phase spring 47B includes two spring main bodies 471B (471B' and 471B") disposed to be spaced apart by a gap in the X-axis direction, the beam 477B connecting the spring main body 471B' and the movable drive electrode 411B, the beam 478B connecting the spring main body 471B" and the movable detection electrode 441B, and the beam 479B connecting the spring main bodies 471B' and 471B" to each other. That is, the reverse phase spring 47B includes a plurality of spring main bodies 471B disposed in series. According to such a configuration, the same effect as that of the described above reverse phase spring 47B can be exhibited.

The physical quantity sensor 1 of the fourth embodiment has been described as above. Even with such a fourth embodiment, the same effects as those of the first embodiment described above can be exhibited. In the fourth embodiment, although the reverse phase spring 47A includes two spring main bodies 471A, the number of the spring main bodies 471A is not limited thereto, and may be three or more. The same applies to the number of the reverse phase springs 47B.

Fifth Embodiment

Next, a physical quantity sensor according to a fifth embodiment will be described.

Figure 12:
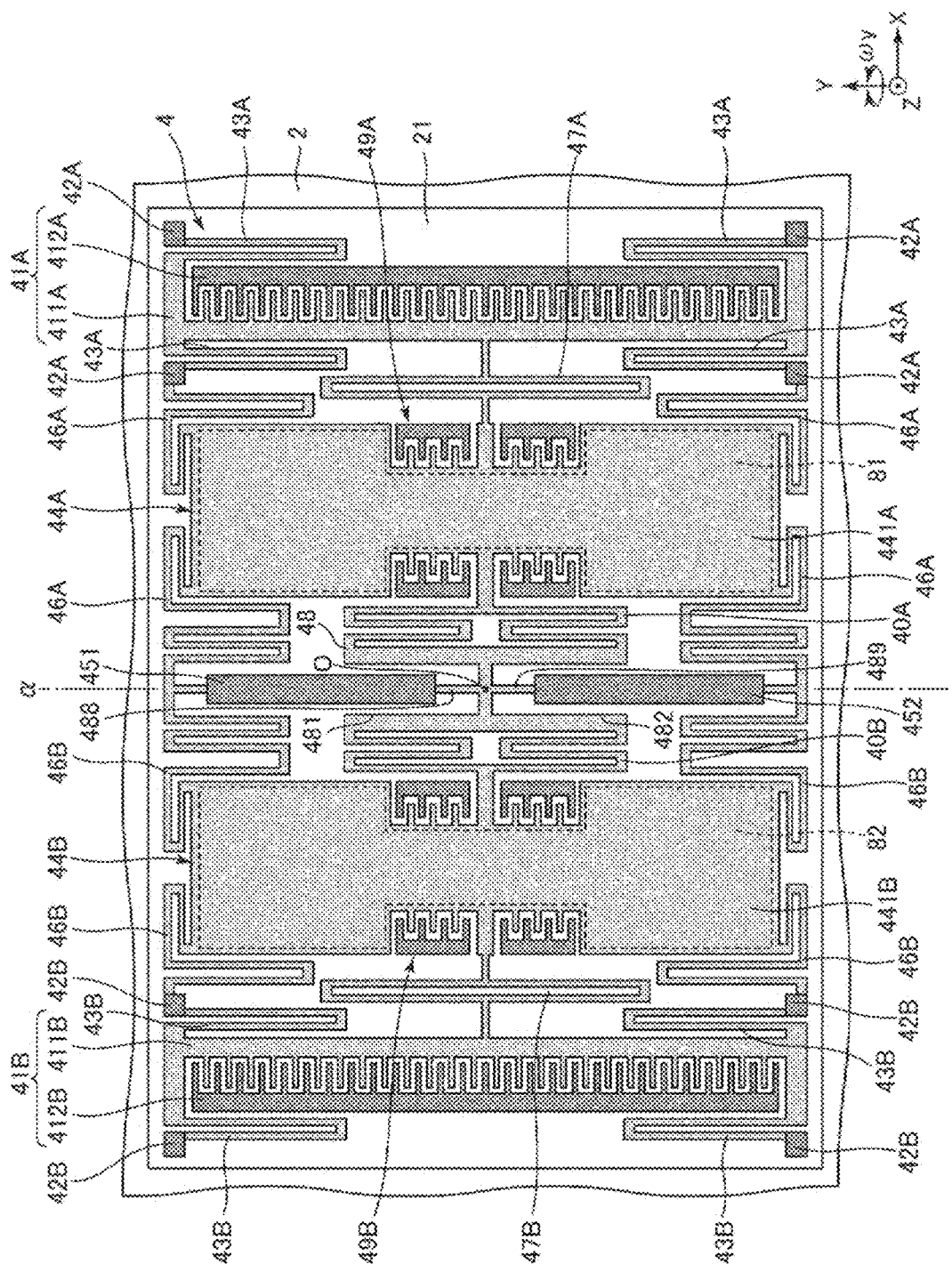
FIG. 12 is a plan view illustrating an element portion of a physical quantity sensor according to a fifth embodiment.

FIG. 12 is a plan view illustrating an element portion of a physical quantity sensor according to a fifth embodiment.

The physical quantity sensor 1 according to the fifth embodiment is the same as the physical quantity sensor 1 according to the first embodiment described above except that the configuration of the element portion 4 is mainly different.

In the following description, regarding the physical quantity sensor 1 of the fifth embodiment, description will be mainly made on the differences from the first embodiment described above, and description of same matters will be omitted. In FIG. 12, the same reference numerals are given to the same configurations as those of the first embodiment described above.

The physical quantity sensor 1 illustrated in FIG. is an angular velocity sensor capable of detecting angular velocity ωy about the Y-axis. In such a physical quantity sensor 1, the fixed detection electrodes 442A, 443A, 442B, and 443B are omitted from the configuration of the first embodiment described above, the detection portion 44A is constituted by the movable detection electrode 441A, and the detection portion 44B is constituted by the movable detection electrode 441B.

Instead, the physical quantity sensor 1 includes a fixed detection electrode 81 which is disposed on the bottom surface of the concave portion 21 and disposed opposite to the movable detection electrode 441A, and a fixed detection electrode 82 which is disposed on the bottom surface of the concave portion 21 and disposed opposite to the movable detection electrode 441B. Although not illustrated, the fixed detection electrode 81 is electrically connected to the wiring 75 and the fixed detection electrode 82 is electrically connected to the wiring 76. When the physical quantity sensor 1 is driven, the electrostatic capacitance Ca is formed between the movable detection electrode 441A and the fixed detection electrode 81 and the electrostatic capacitance Cb is formed between the movable detection electrode 441A and the fixed detection electrode 82.

With such a configuration, when the angular velocity ωy is applied to the physical quantity sensor 1 while being driven in the drive vibration mode, the movable detection electrode vibrates in reverse phase in the Z-axis direction due to the Coriolis force (see arrow in FIG. 12). For that reason, the gap between the movable detection electrode 441A and the fixed detection electrode 81 and the gap between the movable detection electrode 441B and the fixed detection electrode 82 change, respectively, and the electrostatic capacitances Ca and Cb change according to gap change. Accordingly, the angular velocity ωy can be obtained based on changes in the electrostatic capacitances Ca and Cb.

The physical quantity sensor 1 of the fifth embodiment has been described as above. Even with such a fifth embodiment, the same effects as those of the first embodiment described above can be exhibited.

Sixth Embodiment

Next, a physical quantity sensor according to a sixth embodiment will be described.

Figure 13:
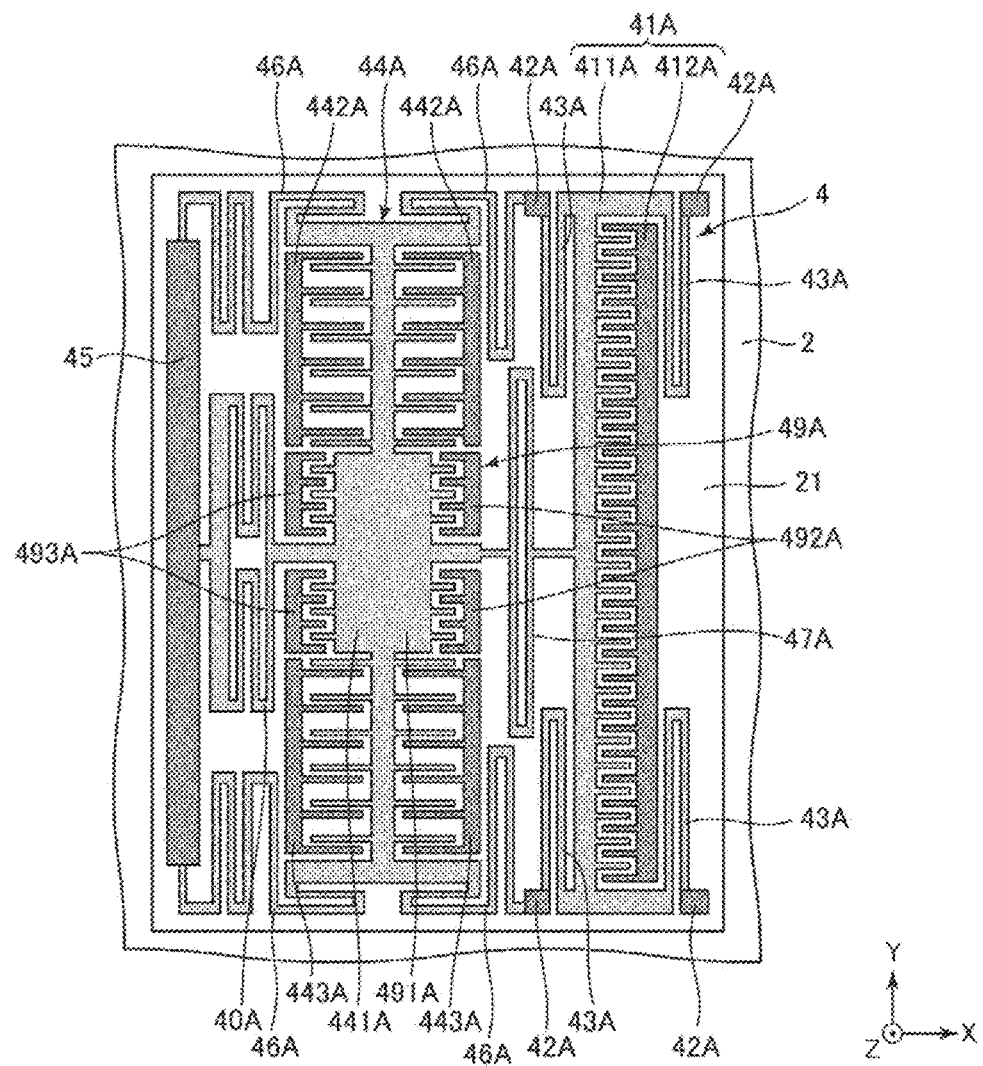
FIG. 13 is a plan view illustrating an element portion of a physical quantity sensor according to a sixth embodiment.

FIG. 13 is a plan view illustrating an element portion of a physical quantity sensor according to a sixth embodiment.

The physical quantity sensor 1 according to the sixth embodiment is the same as the physical quantity sensor 1 according to the first embodiment described above except that the configuration of the element portion 4 is mainly different.

In the following description, regarding the physical quantity sensor 1 of the sixth embodiment, description will be mainly made on the differences from the first embodiment described above, and description of same matters will be omitted. In FIG. 13, the same reference numerals are given to the same configurations as those of the first embodiment described above.

The physical quantity sensor 1 illustrated in FIG. 13 has a configuration in which the vehicle 4B (one side of imaginary straight line α) is mainly omitted from the configuration of the first embodiment described above. Specifically, the physical quantity sensor 1 of the sixth embodiment includes the drive portion 41A including the movable drive electrode 411A and the fixed drive electrode 412A, the detection portion 44A including the movable detection electrode 441A and the fixed detection electrodes 442A and 443A, the four fixed portions 42A disposed around the drive portion 41A, the drive spring 43A for connecting the fixed portion 42A and the movable drive electrode 411A, the fixed portion 45A provided so that the detection portion 44A is positioned between the fixed portion 45A and the drive portion 41A, the detection spring 46A for connecting the fixed portions 422A and 45A and the movable detection electrode 441A, the connection spring 40A for connecting the fixed portion 45A and the movable detection electrode 441A, the reverse phase spring 47A for connecting the movable drive electrode 411A and the movable detection electrode 441A, and the monitor portion 49A including the movable monitor electrode 491A and fixed monitor electrodes 492A and 493A.

According to such a configuration, in the drive vibration mode, the vibration between the movable drive electrode 411A and the movable detection electrode 441A is canceled, and vibration leakage can be reduced. Further, as compared with the configuration of the first embodiment, the size of the element portion 4 can be reduced to about half, and the size of the physical quantity sensor 1 can be reduced.

The physical quantity sensor 1 of the sixth embodiment has been described as above. Even with such a sixth embodiment, the same effects as those of the first embodiment described above can be exhibited.

Seventh Embodiment

Next, an inertia measurement device according to a seventh embodiment will be described.

Figure 14:
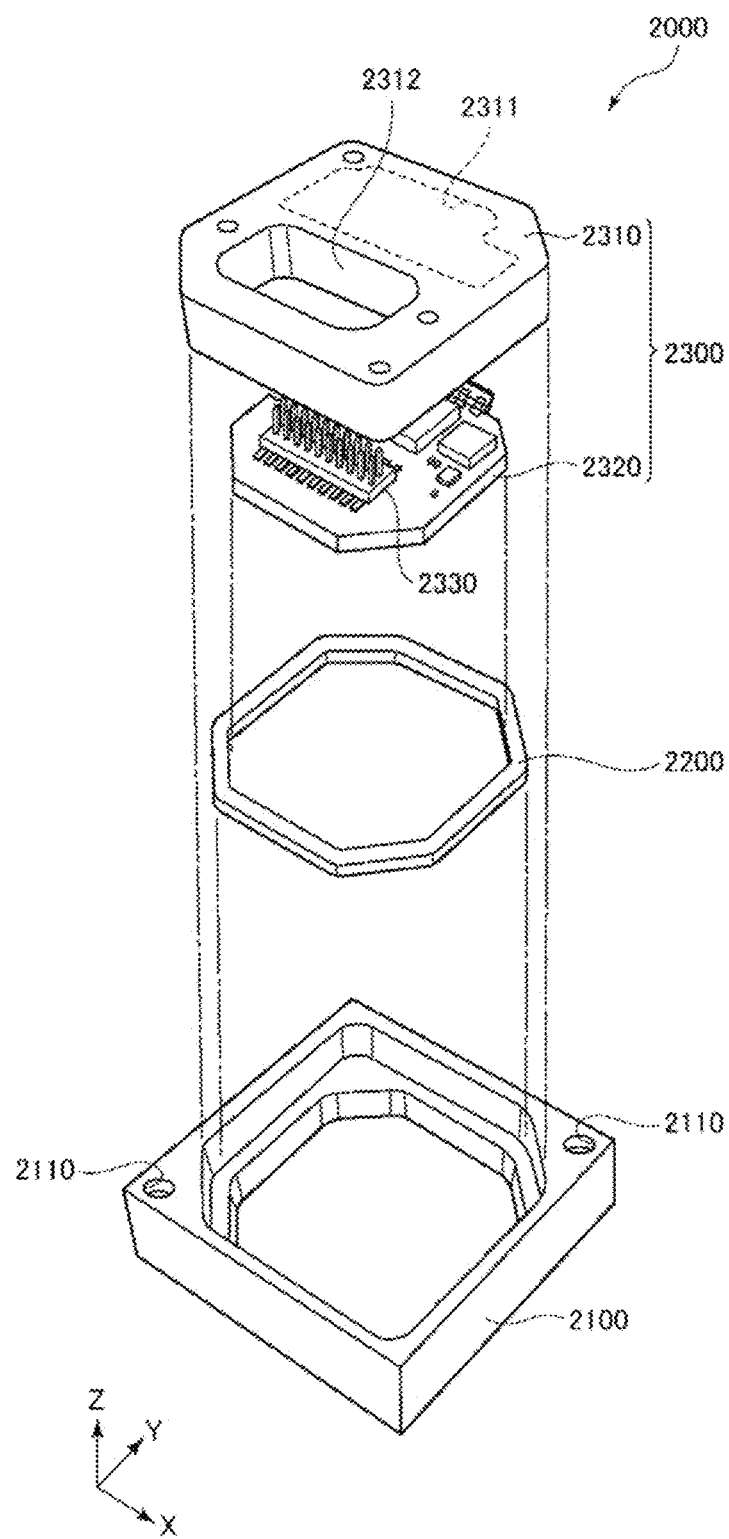
FIG. 14 is an exploded perspective view of an inertia measurement device according to a seventh embodiment.
Figure 15:
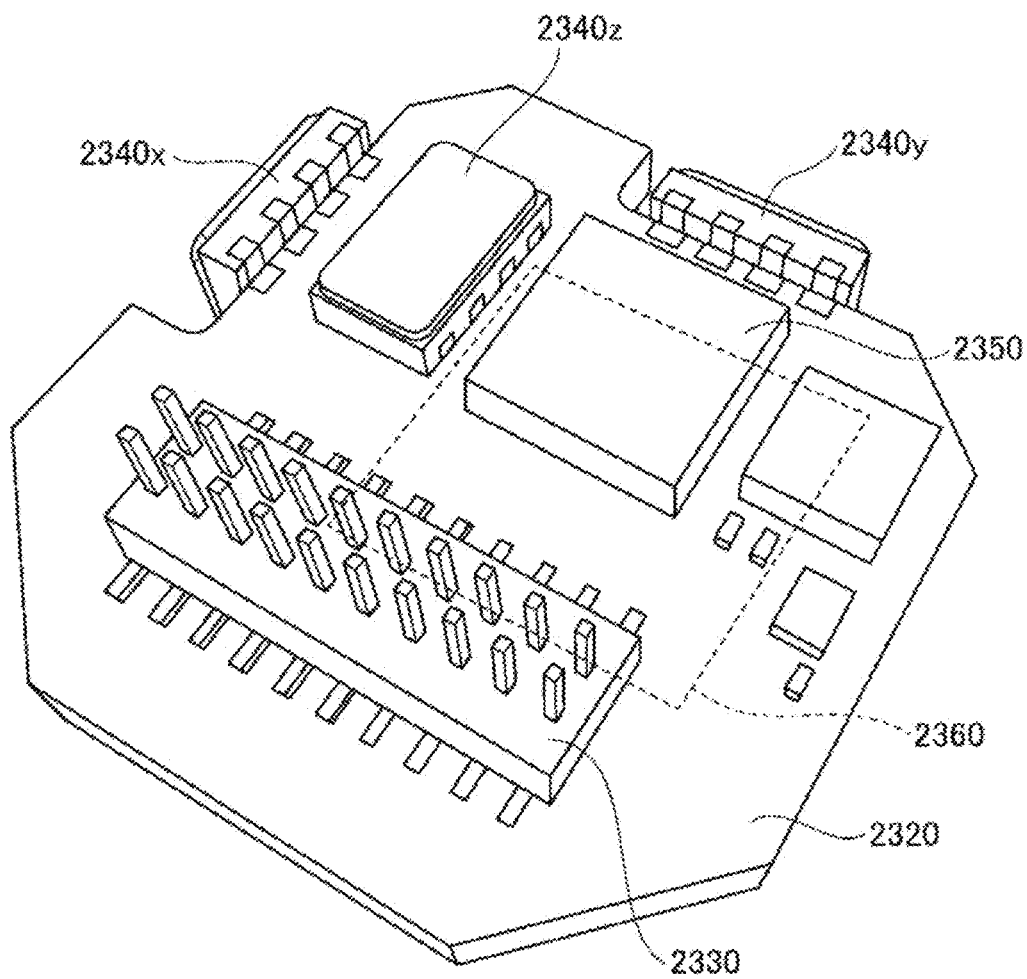
FIG. 15 is a perspective view of a substrate included in the inertia measurement device illustrated in FIG. 14.

FIG. 14 is an exploded perspective view of an inertia measurement device according to a seventh embodiment. FIG. 15 is a perspective view of a substrate included in the inertia measurement device illustrated in FIG. 14.

The inertia measurement device 2000 (IMU: Inertial Measurement Unit) illustrated in FIG. 14 is a device that detects the attitude and behavior (inertial momentum) of a vehicle (mounted device) such as an automobile or a robot. The inertia measurement device 2000 functions as a so-called six-axis motion sensor including three-axis acceleration sensors and three-axis angular velocity sensors.

The inertia measurement device 2000 is a rectangular parallelepiped having a substantially square planar shape. Screw holes 2110 as fixed portions are formed in the vicinity of two vertices positioned in the diagonal direction of the square. Through two screws in the two screw holes 2110, the inertia measurement device 2000 can be fixed to the mounted surface of the mounted object such as an automobile. The size of the inertia measurement device 2000 can be reduced to a size that can be mounted on a smartphone or a digital camera, for example, by selection of parts or design change.

The inertia measurement device 2000 has a configuration in which an outer case 2100, a bonding member 2200, and a sensor module 2300 are included and the sensor module 2300 is inserted in the outer case 2100 with the bonding member 2200 interposed therebetween. Further, the sensor module 2300 includes an inner case 2310 and a substrate 2320.

Similarly to the overall shape of the inertia measurement device 2000, the outer shape of the outer case 2100 is a rectangular parallelepiped having a substantially square planar shape, and screw holes 2110 are formed in the vicinity of two vertices positioned in the diagonal direction of the square. In addition, the outer case 2100 has a box shape and the sensor module 2300 is accommodated therein.

The inner case 2310 is a member for supporting the substrate 2320, and has a shape so as to fit inside the outer case 2100. A concave portion 2311 for preventing contact with the substrate 2320 and an opening 2312 for exposing a connector 2330 described later are formed in the inner case 2310. Such an inner case 2310 is bonded to the outer case 2100 via the bonding member 2200 (for example, a packing impregnated with adhesive). The substrate 2320 is bonded to the lower surface of the inner case 2310 via an adhesive.

As illustrated in FIG. 15, a connector 2330, an angular velocity sensor 2340z for measuring the angular velocity around the Z-axis, an acceleration sensor 2350 for measuring acceleration in each axis directions of the X-axis, the Y-axis, and the Z-axis and the like are mounted on the upper surface of the substrate 2320. An angular velocity sensor 2340x for measuring the angular velocity about the X-axis and an angular velocity sensor 2340y for measuring the angular velocity around the Y-axis are mounted on the side surface of the substrate 2320. The angular velocity sensors 2340z, 2340x, and 2340y are not particularly limited, and for example, a vibration gyro sensor using a Coriolis force can be used. In particular, any one of the configurations of the first to fourth embodiments described above can be used for measuring the angular velocity in the Z-axis direction. The acceleration sensor 2350 is not particularly limited, and for example, a capacitance type acceleration sensor can be used.

A control IC 2360 is mounted on the lower surface of the substrate 2320. The control IC 2360 is a micro controller unit (MCU), which includes a storing unit including a nonvolatile memory, an A/D converter, and the like, and controls each unit of the inertia measurement device 2000. In the storing unit, programs defining the order and contents for measuring the acceleration and angular velocity, programs for digitizing detected data and incorporating the detected data into packet data, accompanying data, and the like are stored. A plurality of electronic components are mounted on the substrate 2320 in addition to the control IC 2360.

The inertia measurement device 2000 (inertia measurement device) has been described as above. Such an inertia measurement device 2000 includes the angular velocity sensors 2340z, 2340x, and 2340y and the acceleration sensors 2350 as the physical quantity sensor, and the control IC 2360 (control circuit) for controlling driving of each of these sensors 2340z, 2340x, 2340y, and 2350. With this configuration, the effect of the physical quantity sensor can be achieved, and the inertia measurement device 2000 with high reliability can be obtained.

Eighth Embodiment

Next, a vehicle positioning device according to an eighth embodiment will be described.

Figure 16:
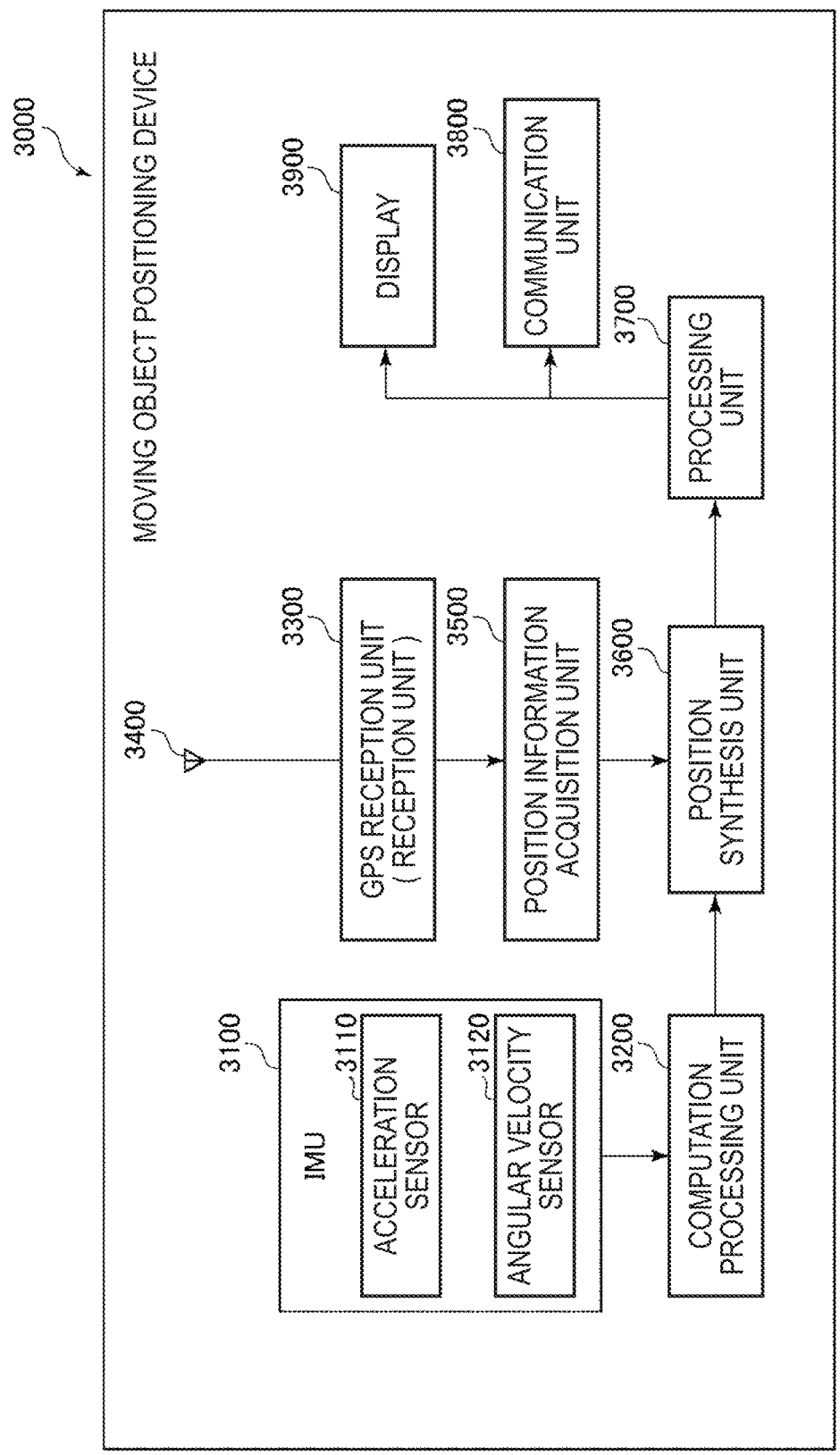
FIG. 16 is a block diagram illustrating an overall system of a vehicle positioning device according to an eighth embodiment of the invention.
Figure 17:
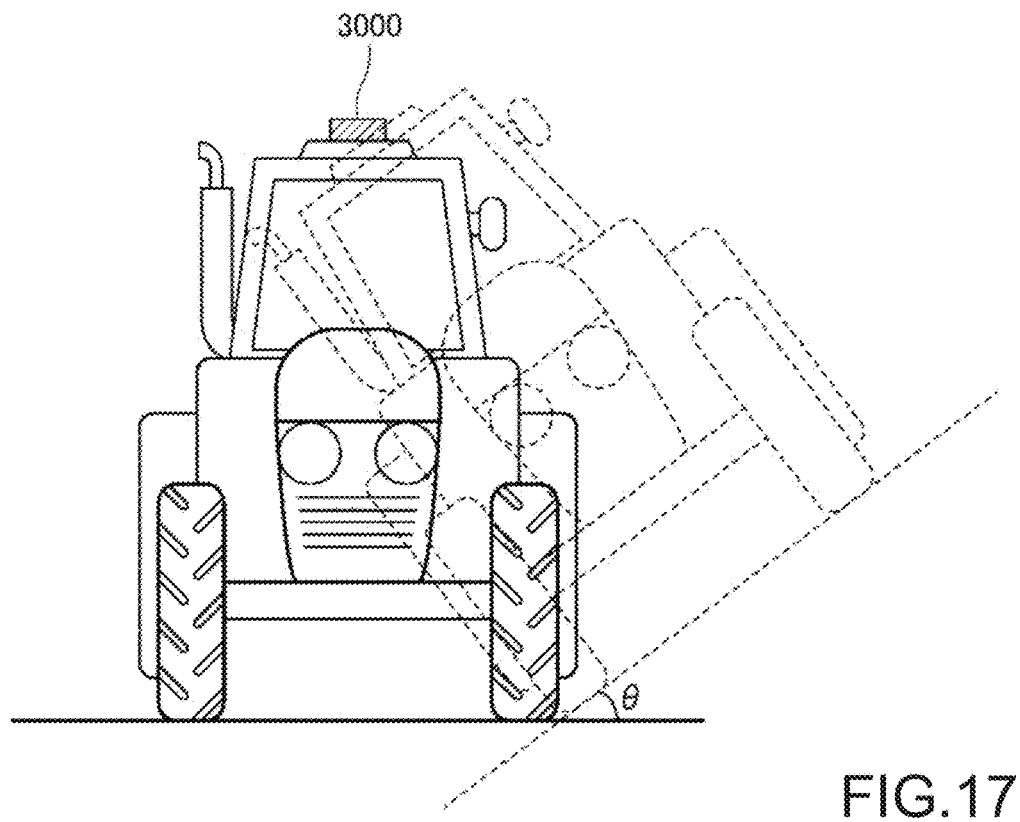
FIG. 17 is a diagram illustrating the operation of the vehicle positioning device illustrated in FIG. 16.

FIG. 16 is a block diagram illustrating the entire system of a vehicle positioning device according to an eighth embodiment. FIG. 17 is a diagram illustrating the operation of the vehicle positioning device illustrated in FIG. 16.

A vehicle positioning device 3000 illustrated in FIG. 16 is a device which is used by being mounted on a vehicle and performs positioning of the vehicle. The vehicle is not particularly limited, and may be any of a bicycle, an automobile (including a four-wheeled automobile and a motorcycle), a train, an airplane, a ship, and the like, but in the eighth embodiment, the vehicle is described as a four-wheeled automobile. The vehicle positioning device 3000 includes an inertia measurement device 3100 (IMU), a computation processing unit 3200, a GPS reception unit 3300, a receiving antenna 3400, a position information acquisition unit 3500, a position synthesis unit 3600, a processing unit 3700, a communication unit 3800, and a display 3900. As the inertia measurement device 3100, for example, the inertia measurement device 2000 of the fourth embodiment described above can be used.

The inertia measurement device 3100 includes a tri-axis acceleration sensor 3110 and a tri-axis angular velocity sensor 3120. The computation processing unit 3200 receives acceleration data from the acceleration sensor 3110 and angular velocity data from the angular velocity sensor 3120, performs inertial navigation computation processing on these data, and outputs inertial navigation positioning data (data including acceleration and attitude of the vehicle).

The GPS reception unit 3300 receives a signal (GPS carrier wave, satellite signal on which position information is superimposed) from the GPS satellite via the receiving antenna 3400. Further, the position information acquisition unit 3500 outputs GPS positioning data representing the position (latitude, longitude, altitude), speed, direction of the vehicle positioning device 3000 (vehicle) based on the signal received by the GPS reception unit 3300. The GPS positioning data also includes status data indicating a reception state, a reception time, and the like.

Based on inertial navigation positioning data output from the computation processing unit 3200 and the GPS positioning data output from the position information acquisition unit 3500, the position synthesis unit 3600 calculates the position of the vehicle, more specifically, the position on the ground where the vehicle is traveling. For example, even if the position of the vehicle included in the GPS positioning data is the same, as illustrated in FIG. 17, if the attitude of the vehicle is different due to the influence of inclination of the ground or the like, the vehicle is traveling at different positions on the ground. For that reason, it is impossible to calculate an accurate position of the vehicle with only GPS positioning data. Therefore, the position synthesis unit 3600 calculates the position on the ground where the vehicle is traveling, using inertial navigation positioning data (in particular, data on the attitude of the vehicle). This determination can be made comparatively easily by computation using a trigonometric function (inclination $\theta$ with respect to the vertical direction).

The position data output from the position synthesis unit 3600 is subjected to predetermined processing by the processing unit 3700 and displayed on the display 3900 as a positioning result. Further, the position data may be transmitted to the external device by the communication unit 3800.

The vehicle positioning device 3000 has been described as above. As described above, such a vehicle positioning device 3000 includes the inertia measurement device 3100, the GPS reception unit 3300 (reception unit) that receives a satellite signal on which position information is superimposed from a positioning satellite, the position information acquisition unit 3500 (acquisition unit) that acquires position information of the GPS reception unit 3300 based on the received satellite signal, the computation processing unit 3200 (computation unit) that computes the attitude of the vehicle based on the inertial navigation positioning data (inertia data) output from the inertia measurement device 3100, and the position synthesis unit 3600 (calculation unit) that calculates the position of the vehicle by correcting position information based on the calculated attitude. With this configuration, the effect of the inertia measurement device can be achieved, and the vehicle positioning device 3000 with high reliability can be obtained.

Ninth Embodiment

Next, an electronic apparatus according to a ninth embodiment will be described.

Figure 18:
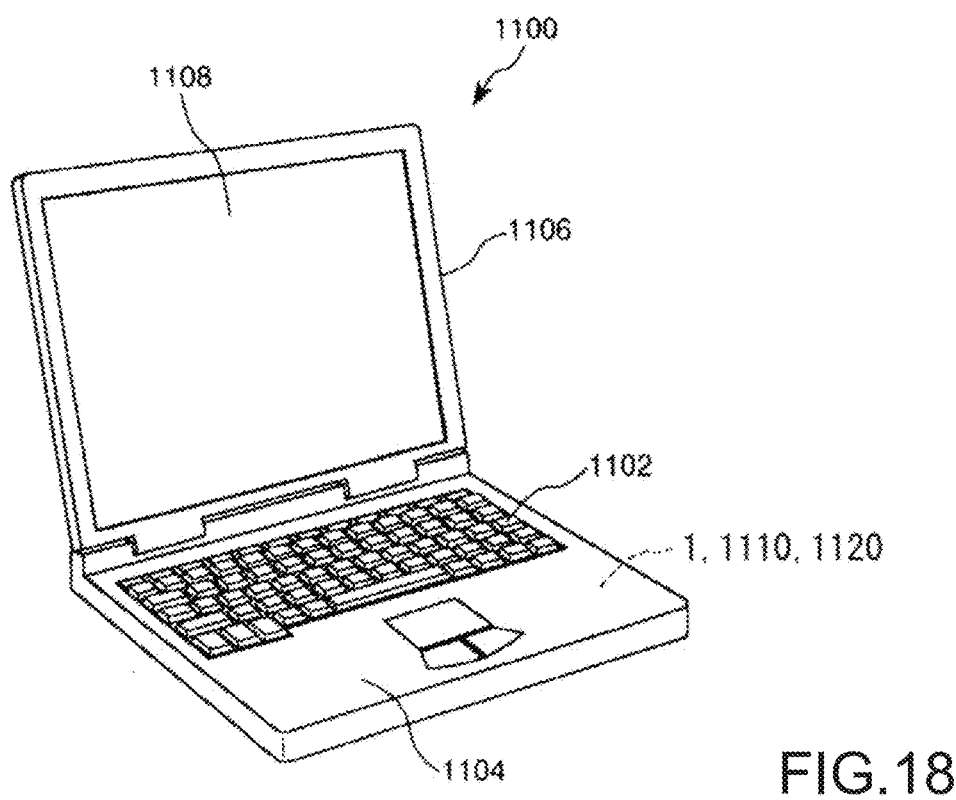
FIG. 18 is a perspective view illustrating an electronic apparatus according to a ninth embodiment.

FIG. 18 is a perspective view illustrating an electronic apparatus according to a ninth embodiment.

The mobile type (or notebook type) personal computer 1100 illustrated in FIG. 18 is a personal computer to which the electronic apparatus according to the invention is applied. In FIG. 18, the personal computer 1100 is constituted with a main body 1104 including a keyboard 1102 and a display unit 1106 including a display 1108, and the display unit 1106 is supported so as to be rotatable with respect to the main body 1104 via a hinge structure.

In such a personal computer 1100, the physical quantity sensor 1, a control circuit 1110 for controlling driving of the physical quantity sensor 1, a correction circuit 1120 for correcting the physical quantity detected by the physical quantity sensor 1, for example, based on environmental temperature, are built in. The physical quantity sensor 1 is not particularly limited, but any of the embodiments described above can be used, for example.

Such a personal computer 1100 (electronic apparatus) includes the physical quantity sensor 1, the control circuit 1110, and the correction circuit 1120. For that reason, the effect of the physical quantity sensor 1 described above can be achieved and high reliability can be exhibited.

Tenth Embodiment

Next, an electronic apparatus according to a tenth embodiment will be described.

Figure 19:
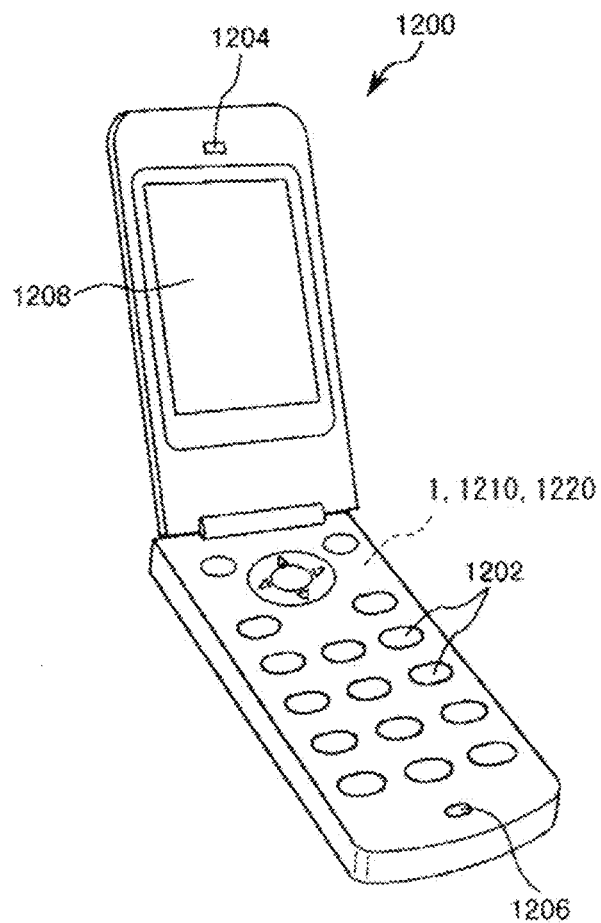
FIG. 19 is a perspective view illustrating an electronic apparatus according to a tenth embodiment.

FIG. 19 is a perspective view illustrating an electronic apparatus according to a tenth embodiment.

The mobile phone 1200 (including PHS) illustrated in FIG. 19 is a mobile phone to which the electronic apparatus according to the invention is applied. In FIG. 19, the mobile phone 1200 includes an antenna (not illustrated), a plurality of operation buttons 1202, an earpiece 1204, and a mouthpiece 1206, and a display 1208 is disposed between the operation button 1202 and the earpiece 1204.

In such a mobile phone 1200, the physical quantity sensor 1, a control circuit 1210 for controlling driving of the physical quantity sensor 1, a correction circuit 1220 for correcting the physical quantity detected by the physical quantity sensor 1, for example, based on environmental temperature, are built in. The physical quantity sensor 1 is not particularly limited, but any of the embodiments described above can be used, for example.

Such a mobile phone 1200 (electronic apparatus) includes the physical quantity sensor 1, the control circuit 1210, and the correction circuit 1220. For that reason, the effect of the physical quantity sensor 1 described above can be achieved and high reliability can be exhibited.

Eleventh Embodiment

Next, an electronic apparatus according to an eleventh embodiment will be described.

Figure 20:
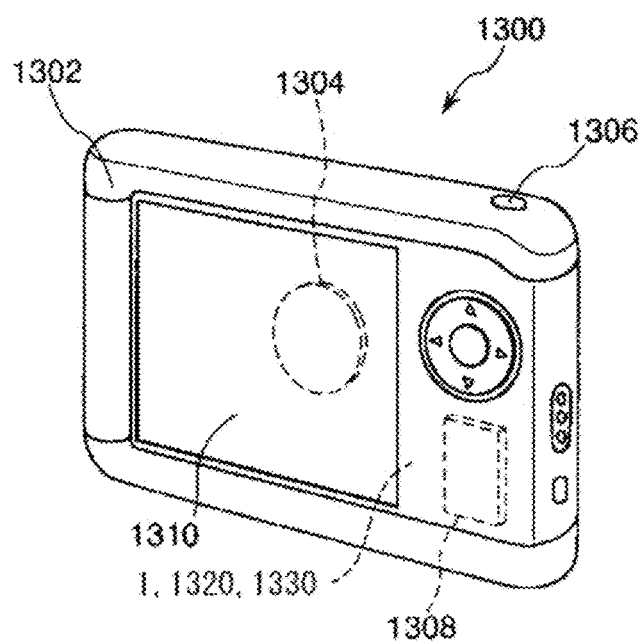
FIG. 20 is a perspective view illustrating an electronic apparatus according to an eleventh embodiment.

FIG. 20 is a perspective view illustrating an electronic apparatus according to an eleventh embodiment.

A digital still camera 1300 illustrated in FIG. is a digital still camera to which the electronic apparatus according to the invention is applied. In FIG. 20, a display 1310 is provided on the rear surface of a case 1302, and the display 1310 is configured to perform display based on an imaging signal from the CCD, and the display 1310 functions as a viewfinder for displaying a subject as an electronic image. A light reception unit 1304 including an optical lens (imaging optical system) and a CCD or the like is provided on the front side (back side in the figure) of the case 1302. When a photographer confirms a subject image displayed on the display 1310 and presses a shutter button 1306, the imaging signal of the CCD at that time is transferred to and stored in the memory 1308.

In such a digital still camera 1300, the physical quantity sensor 1, a control circuit 1320 for controlling driving of the physical quantity sensor 1, a correction circuit 1330 for correcting the physical quantity detected by the physical quantity sensor 1, for example, based on environment temperature, are built in. The physical quantity sensor 1 is not particularly limited, but any of the embodiments described above can be used, for example.

Such a digital still camera 1300 (electronic apparatus) includes the physical quantity sensor 1, the control circuit 1320, and the correction circuit 1330. For that reason, the effect of the physical quantity sensor 1 described above can be achieved and high reliability can be exhibited.

In addition to the personal computer and mobile phone of the embodiments described above and the digital still camera of the eleventh embodiment, the electronic apparatus can be applied to, for example, a smartphone, a tablet terminal, a clock (including smart watch), an ink jet type discharging device (for example, an ink jet printer), a laptop personal computer, a TV, a wearable terminals such as HMD (head mounted display), a video camera, a video tape recorder, a car navigation device, a pager, an electronic diary (including with communication function), an electronic dictionary, a calculator, an electronic game machines, a word processor, a work station, a videophone, a security TV monitor, an electronic binoculars, a POS terminal, medical equipment (for example, electronic clinical thermometer, blood pressure monometer, blood glucose meter, electrocardiogram measurement device, ultrasonic diagnostic device, electronic endoscope), a fish finder, various measuring instruments, mobile terminal base station equipment, instruments (for example, instruments of vehicles, aircraft, and ships), a flight simulator, a network server, and the like.

Twelfth Embodiment

Next, a portable electronic apparatus according to a twelfth embodiment will be described.

Figure 21:
FIG. 21 is a plan view illustrating a portable electronic apparatus according to a twelfth embodiment.
Figure 22:
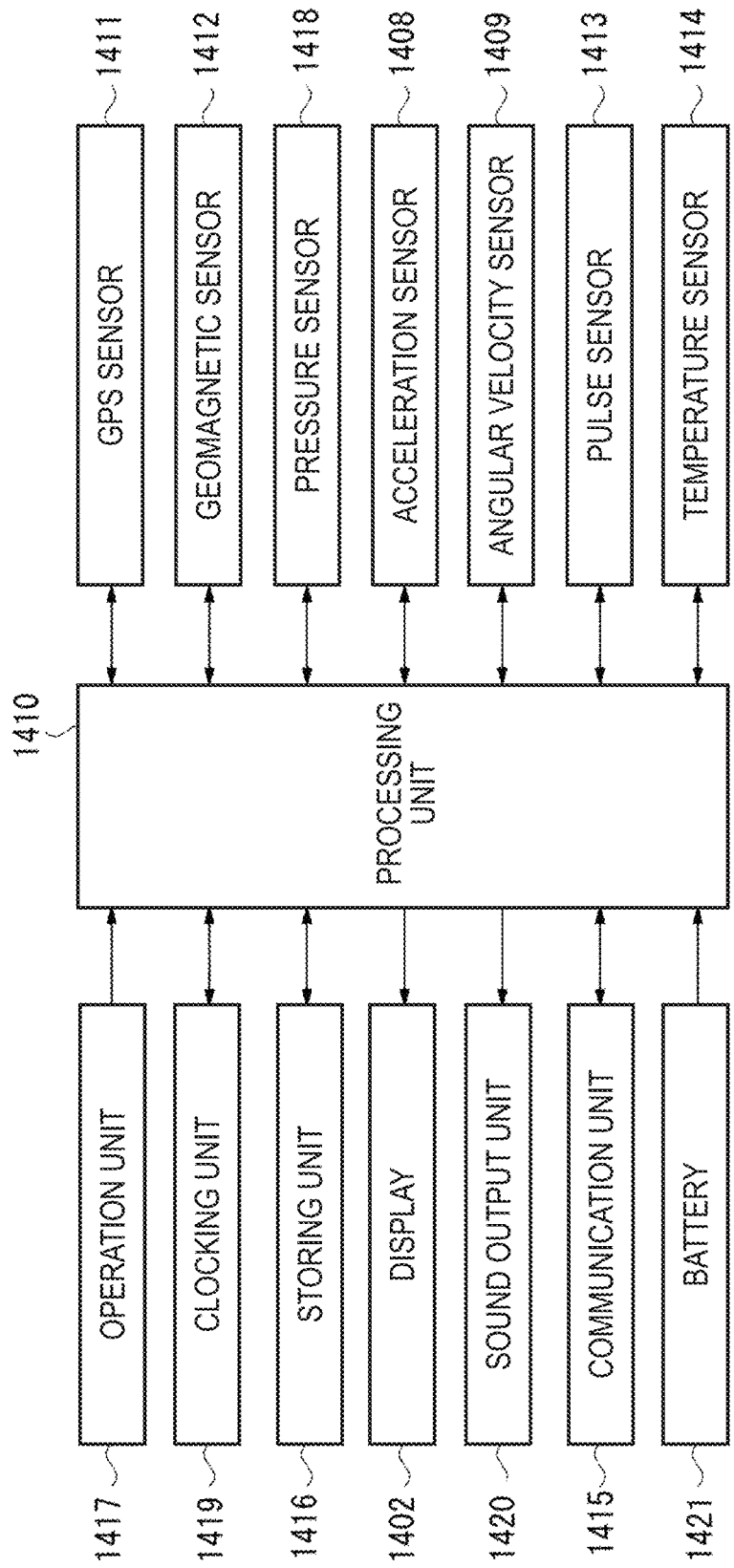
FIG. 22 is a functional block diagram illustrating a schematic configuration of the portable electronic apparatus illustrated in FIG. 21.

FIG. 21 is a plan view illustrating a portable electronic apparatus according to a twelfth embodiment. FIG. 22 is a functional block diagram illustrating a schematic configuration of the portable electronic apparatus illustrated in FIG. 21.

A watch type activity meter 1400 (active tracker) illustrated in FIG. 21 is a wristwatch device to which the portable electronic apparatus according to the invention is applied. The activity meter 1400 is attached to a part (subject) such as the user's wristwatch by a band 1401. The activity meter 1400 includes a display 1402 for digital display and can perform wireless communication. The physical quantity sensor 1 described above is incorporated in the activity meter 1400 as a sensor for measuring acceleration and a sensor for measuring angular velocity.

The activity meter 1400 includes a case 1403 accommodating the physical quantity sensor 1, a processing unit 1410 which is accommodated in the case 1403 and is for processing output data from the physical quantity sensor 1, the display 1402 accommodated in the case 1403, and a translucent cover 1404 covering the opening of the case 1403. A bezel 1405 is provided outside the translucent cover 1404. A plurality of operation buttons 1406 and 1407 are provided on the side surface of the case 1403.

As illustrated in FIG. 22, the acceleration sensor 1408 serving as the physical quantity sensor 1 measures acceleration in each of the three axis directions which intersect (ideally orthogonal to) each other, and outputs a signal (acceleration signal) according to the magnitude and direction of the detected three-axis acceleration. An angular velocity sensor 1409 measures angular velocity in each of the three axis directions intersecting (ideally orthogonal to) each other, and outputs a signal (angular velocity signal) according to the magnitude and direction of the detected three-axis angular velocity.

In the liquid crystal display (LCD) constituting the display 1402, depending on various detection modes, for example, position information using a GPS sensor 1411 and a geomagnetic sensor 1412, exercise information such as the amount of exercise using the acceleration sensor 1408 and the angular velocity sensor 1409 included in the physical quantity sensor 1, biometric information such as a pulse rate using a pulse sensor 1413 or the like, and time information such as current time, and the like are displayed. The environmental temperature using a temperature sensor 1414 can also be displayed.

A communication unit 1415 performs various controls for establishing communication between a user terminal and an information terminal (not illustrated). The communication unit 1415 is configure to include a transceiver compatible with the short range wireless communication standard such as a Bluetooth (registered trademark) (including BTLE: Bluetooth Low Energy), Wireless Fidelity (Wi-Fi) (registered trademark), Zigbee (registered trademark), near field communication (NFC), ANT+ (registered trademark) or the like, and a connector compatible with a communication bus standard such as the universal serial bus (USB) or the like.

The processing unit 1410 (processor) is constituted by, for example, a micro processing unit (MPU), a digital signal processor (DSP), an application specific integrated circuit (ASIC), or the like. The processing unit 1410 executes various processing based on the program stored in a storing unit 1416 and a signal input from an operation unit 1417 (for example, operation buttons 1406 and 1407). Processing by the processing unit 1410 includes data processing for each output signal of the GPS sensor 1411, the geomagnetic sensor 1412, a pressure sensor 1418, the acceleration sensor 1408, the angular velocity sensor 1409, the pulse sensor 1413, the temperature sensor 1414, and the clocking unit 1419, display processing for causing the display 1402 to display an image, sound output processing for causing a sound output unit 1420 to output sound, communication processing for performing communication with the information terminal via the communication unit 1415, and power control processing for supplying power from a battery 1421 to each unit, and the like.

Such an activity meter 1400 can have at least the following functions.

1. Distance: Measure the total distance from the start of measurement with highly accurate GPS function.
2. Pace: Display a current running pace from pace distance measurement.
3. Average speed: Calculate an average speed and display the average speed from the start of running to the present.

4. Altitude: Measure and display altitude with GPS function.

5. Stride: Measure and display the stride even in a tunnel where GPS radio waves do not reach.

6. Pitch: Measure and display the number of steps per minute.

7. Heart rate: The heart rate is measured and displayed by the pulse sensor.

8. Gradient: Measure and display the gradient of the ground in training and trail runs in the mountains.

9. Auto lap: Automatically perform lap measurement when running for a fixed distance set in advance or for a fixed time.

10. Exercise consumption calorie: Display calorie consumption.

11. Step count: Display the total number of steps from the start of the exercise.

Such an activity meter 1400 (portable electronic apparatus) includes the physical quantity sensor 1, the case 1403 accommodating the physical quantity sensor 1, the processing unit 1410 which is accommodated in the case 1403 and performs processing output data from the physical quantity sensor 1, the display 1402 accommodated in the case 1403, and the translucent cover 1404 covering the opening portion of the case 1403. For that reason, the effect of the physical quantity sensor 1 described above can be achieved and high reliability can be exhibited.

The activity meter 1400 can be widely applied to a running watch, a runner's watch, a runner's watch for multiple sports such as duathlon and triathlon, an outdoor watch, and a GPS watch equipped with a satellite positioning system such as the GPS.

In the above description, although description is made by using the global positioning system (GPS) as a satellite positioning system, other global navigation satellite system (GNSS) may be used. For example, one or more of satellite positioning systems among satellite positioning systems such as European geostationary-satellite navigation overlay service (EGNOS), quasi zenith satellite system (QZSS), global navigation satellite system (GLONASS), GALILEO, Beidou navigation satellite system (Bei Dou) may be used. Also, a stationary satellite type satellite-based augmentation system (SBAS) such as wide area augmentation system (WAAS) or European geostationary-satellite navigation overlay service (EGNOS) may be utilized in at least one of the satellite positioning systems.

Thirteenth Embodiment

Next, a vehicle according to a thirteenth embodiment will be described.

Figure 23:
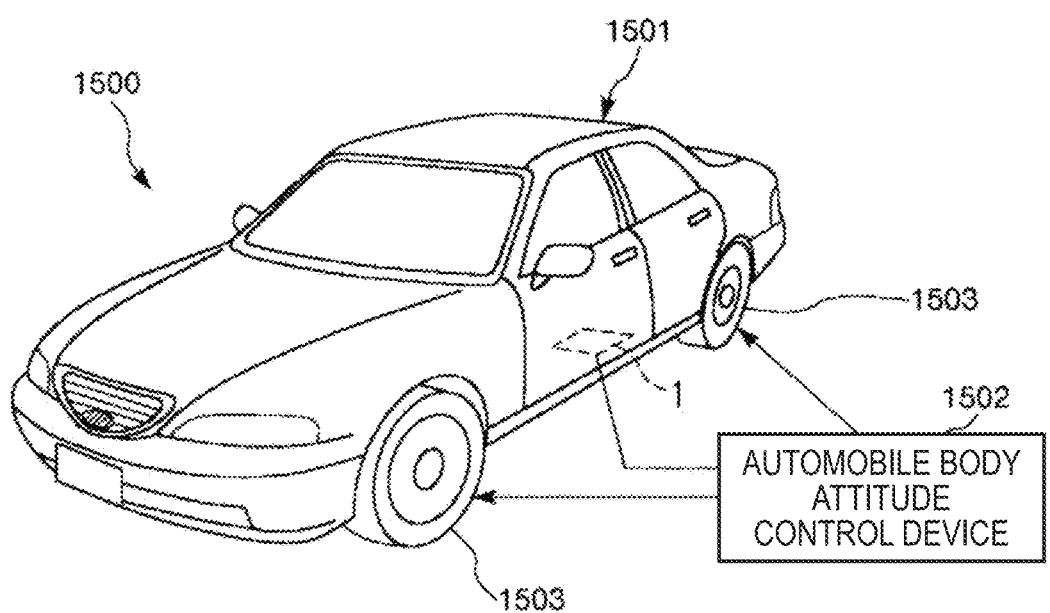
FIG. 23 is a perspective view illustrating a vehicle according to a thirteenth embodiment.

FIG. 23 is a perspective view illustrating a vehicle according to a thirteenth embodiment.

An automobile 1500 illustrated in FIG. 23 is an automobile to which the vehicle according to the invention is applied. In FIG. 23, the physical quantity sensor 1 functioning as at least one of an acceleration sensor and an angular velocity sensor (preferably a composite sensor capable of measuring both of acceleration and angular velocity) is built in the automobile 1500, and the attitude of an automobile body 1501 can be detected by the physical quantity sensor 1. The detection signal of the physical quantity sensor 1 is supplied to an automobile body attitude control device 1502 (attitude control unit), and the automobile body attitude control device 1502 detects the attitude of the automobile body 1501 based on the signal, and can control hardness of the suspension or can control the brakes of individual wheels 1503 according to the measured result. Here, as the physical quantity sensor 1, for example, the same physical quantity sensor as that of each of the embodiments described above can be used.

Such an automobile 1500 (vehicle) includes the physical quantity sensor 1 and an automobile body attitude control device 1502 (attitude control unit). For that reason, the effect of the physical quantity sensor 1 described above can be achieved, and high reliability can be exhibited.

The physical quantity sensor 1 can also be widely applied to a car navigation system, a car air conditioner, an anti-lock braking system (ABS), an air bag, a tire pressure monitoring system (TPMS), an engine control, and an electronic control unit (ECU) such as a battery monitor of a hybrid car or an electric automobile.

Also, the vehicle is not limited to the automobile 1500, but can also be applied to an airplane, a rocket, an artificial satellite, a ship, an automated guided vehicle (AGV), a biped walking robot, unmanned airplanes such as a drone, and the like.

Although the physical quantity sensor, the inertia measurement device, the vehicle positioning device, the portable electronic apparatus, the electronic apparatus, and the vehicle according to the invention have been described based on the illustrated embodiments, the invention is not limited thereto. The configuration of each unit can be replaced with any configuration having the same function. In addition, any other constituent element may be added to the invention. Further, the embodiments described above may be appropriately combined.

In the embodiments described above, the physical quantity sensor that detects the angular velocity has been described, but is not limited thereto. The physical quantity sensor may be one that detects acceleration, for example. Alternatively, physical quantity sensor may be one that detects both acceleration and angular velocity.

Although the X-axis, the Y-axis, and the Z-axis are orthogonal to each other in the embodiments described above, the invention is not limited thereto as long as the X-axis, the Y-axis, and the Z-axis intersect each other. For example, the X-axis may be slightly inclined with respect to the normal direction of the YZ plane, the Y-axis may be slightly inclined with respect to the normal direction of the XZ plane or the Z-axis may be slightly inclined with respect to the normal direction of the XY plane. Incidentally, "slightly" means the range in which the physical quantity sensor can exhibit its effect, and a specific inclination angle (numerical value) varies depending on a configuration and the like.

What is claimed is:

1. A physical quantity sensor comprising:
a substrate;
a first drive vibrator that faces the substrate;
a first detection vibrator that faces the substrate;
a first elastic deformation portion that is disposed between the first drive vibrator and the first detection vibrator and is elastically deformable along a first axis in which the first drive vibrator and the first detection vibrator are aligned, in a plan view;
a second drive vibrator that faces the substrate;
a second detection vibrator that faces the substrate; and
a second elastic deformation portion that is disposed between the second drive vibrator and the second detection vibrator and is elastically deformable along the first axis in which the second drive vibrator and the second detection vibrator are aligned, in the plan view, wherein the first drive vibrator and the first detection vibrator vibrate in reverse phases to each other along the first axis, and the second drive vibrator and the second detection vibrator vibrate in reverse phases to each other along the first axis.

2. The physical quantity sensor according to claim 1, wherein the first drive vibrator and the first detection vibrator vibrate so as to repeatedly approach and separate from each other along the first axis, and the second drive vibrator and the second detection vibrator vibrate so as to repeatedly approach and separate from each other along the first axis.

3. The physical quantity sensor according to claim 1, wherein a mass of the first drive vibrator and a mass of the first detection vibrator are different.

4. The physical quantity sensor according to claim 1, wherein a mass of the first drive vibrator is smaller than a mass of the first detection vibrator.

5. The physical quantity sensor according to claim 1, wherein an amplitude of the first detection vibrator vibrating along the first axis is larger than an amplitude of the first drive vibrator vibrating along the first axis.

6. The physical quantity sensor according to claim 1, wherein the first elastic deformation portion includes an elastic deformation portion main body, a first beam connecting the elastic deformation portion main body and the first drive vibrator, and a second beam connecting the elastic deformation portion main body and the first detection vibrator.

7. The physical quantity sensor according to claim 6, wherein the elastic deformation portion main body includes a first arm of which a longitudinal direction is along a second axis orthogonal to the first axis and which is elastically deformable along the first axis, a second arm of which a longitudinal direction is along the second axis, which is disposed to be spaced apart from the first arm by a gap along the first axis, and which is elastically deformable along the first axis, a first connection portion connecting one end sides of the first arm and the second arm with each other, and a second connection portion connecting the other end sides of the first arm and the second arm with each other.

8. The physical quantity sensor according to claim 6, wherein the first elastic deformation portion includes a plurality of the elastic deformation portion main bodies disposed in series.

9. The physical quantity sensor according to claim 1, wherein a plurality of the first elastic deformation portions are provided.

10. The physical quantity sensor according to claim 1, wherein the first elastic deformation portion has a spring shape.

11. An inertia measurement device comprising:

the physical quantity sensor according to claim 1; and a control circuit which controls driving of the physical quantity sensor.

12. A vehicle positioning device comprising:

the inertia measurement device according to claim 11;

a reception unit that receives a satellite signal on which position information is superimposed from a positioning satellite;

an acquisition unit that acquires position information of the reception unit based on the received satellite signal;

a computation unit that computes an attitude of the vehicle based on inertia data output from the inertia measurement device; and a calculation unit that calculates a position of the vehicle by correcting the position information based on the calculated attitude.

13. A portable electronic apparatus comprising:

the physical quantity sensor according to claim 1;

a case that accommodates the physical quantity sensor;

a processing unit that is accommodated in the case and processes output data from the physical quantity sensor;

a display that is accommodated in the case; and a translucent cover that covers an opening of the case.

14. An electronic apparatus comprising:

the physical quantity sensor according to claim 1;

a control circuit; and a correction circuit.

15. A vehicle comprising:

the physical quantity sensor according to claim 1; and an attitude control unit.

16. The physical quantity sensor according to claim 1, wherein the first detection vibrator and the second detection vibrator are connected via a connection spring.

17. The physical quantity sensor according to claim 1, wherein the first detection vibrator and the second detection vibrator vibrate in reverse phases to each other along the first axis.

18. The physical quantity sensor according to claim 1, wherein the first drive vibrator and the second detection vibrator vibrate in phase with each other along the first axis.

19. The physical quantity sensor according to claim 1, wherein the first detection vibrator has a movable monitor electrode with electrode fingers.

20. The physical quantity sensor according to claim 1, wherein the first detection vibrator has a movable detection electrode with electrode fingers.

* * * * *